(12) United States Patent
Lin et al.

(10) Patent No.: US 12,505,826 B2
(45) Date of Patent: Dec. 23, 2025

(54) AUDIO PROCESSING METHOD AND APPARATUS BASED ON ARTIFICIAL INTELLIGENCE, ELECTRONIC DEVICE, COMPUTER PROGRAM PRODUCT, AND COMPUTER-READABLE STORAGE MEDIUM

(71) Applicant: Tencent Technology (Shenzhen) Company Limited, Shenzhen (CN)

(72) Inventors: Binghuai Lin, Shenzhen (CN); Liyuan Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 405 days.

(21) Appl. No.: 18/203,469

(22) Filed: May 30, 2023

(65) Prior Publication Data
US 2023/0306959 A1 Sep. 28, 2023

Related U.S. Application Data

(63) Continuation of application No. PCT/CN2022/122553, filed on Sep. 29, 2022.

(30) Foreign Application Priority Data

Nov. 26, 2021 (CN) .......................... 202111421900.X

(51) Int. Cl.
*G10L 15/00* (2013.01)
*G10L 15/02* (2006.01)
(Continued)

(52) U.S. Cl.
CPC .............. *G10L 15/02* (2013.01); *G10L 15/16* (2013.01); *G10L 15/22* (2013.01); *G10L 2015/025* (2013.01); *G10L 15/30* (2013.01)

(58) Field of Classification Search
CPC ......... G10L 15/16; G10L 25/27; G10L 25/30; G10L 19/005; G10L 19/00; G10L 15/02;
(Continued)

(56) References Cited

U.S. PATENT DOCUMENTS 11,072,344 B2 * 7/2021 Provost ................... G10L 15/16
2021/0233513 A1 7/2021 Su et al.

FOREIGN PATENT DOCUMENTS

CN 104756182 A 7/2015
CN 106297828 A 1/2017
(Continued)

OTHER PUBLICATIONS

Tencent Technology, WO, PCT/CN2022/122553, Jan. 5, 2023, 4 pgs.
(Continued)

*Primary Examiner* — Vu B Hang
(74) *Attorney, Agent, or Firm* — Morgan, Lewis & Bockius LLP

(57) ABSTRACT

This application provides an audio processing method performed by an electronic device. The method includes: determining a phoneme feature of at least one phoneme of a given text; determining an audio feature of an audio frame in audio data corresponding to the text; for the audio frame: obtaining a weight of the phoneme feature of the at least one phoneme based on a mapping relationship between the phoneme feature of the at least one phoneme and the audio feature of the audio frame, fusing the audio feature of the audio frame and the phoneme feature of the at least one phoneme based on the weight of the phoneme feature of the at least one phoneme to obtain a fused feature of the audio frame, and determining a start time and a stop time of a phoneme in the audio data based on the fused feature of the audio frame.

18 Claims, 15 Drawing Sheets

(51) Int. Cl.
*G10L 15/16* (2006.01)
*G10L 15/22* (2006.01)
*G10L 15/30* (2013.01)

(58) Field of Classification Search
CPC ....... G10L 15/12; G10L 15/22; G10L 15/063;
G10L 15/07; G10L 15/20; G10L 15/26;
G10L 15/187; G10L 15/08; G10L 15/065;
G10L 2015/0631; G10L 19/02; G10L
19/10; G10L 19/12; G10L 19/06; G10L
19/0018
See application file for complete search history.

(56) References Cited

FOREIGN PATENT DOCUMENTS

| CN | 111105785 A | 5/2020 |
|---|---|---|
| CN | 111312231 A | 6/2020 |
| CN | 111754978 A | 10/2020 |
| CN | 113436608 A | 9/2021 |
| CN | 113536029 A | 10/2021 |
| CN | 114360504 A | 4/2022 |
| GB | 2575423 A | 1/2020 |
| JP | 2001175275 A | 6/2001 |
| JP | 2004077901 A | 3/2004 |

OTHER PUBLICATIONS

Tencent Technology, IPRP, PCT/CN2022/122553, May 2, 2024, 5 pgs.
Tencent Technology, Extended European Search Report, EP Patent Application No. 22897381.4, Oct. 8, 2024, 12 pgs.
Binghuai Lin et al., "Learning Acoustic Frame Labeling for Phoneme Segmentation with Regularized Attention Mechanism", IEEE International Conference on Acoustics, Speech and Signal Processing (ICASSP), DOI: 10.1109/ICASSP43922.2022.9746880, May 2022, 5 pgs.

* cited by examiner

AUDIO PROCESSING METHOD AND APPARATUS BASED ON ARTIFICIAL INTELLIGENCE, ELECTRONIC DEVICE, COMPUTER PROGRAM PRODUCT, AND COMPUTER-READABLE STORAGE MEDIUM

CROSS-REFERENCE TO RELATED APPLICATIONS

This application is a continuation application of PCT Patent Application No. PCT/CN2022/122553, entitled "AUDIO PROCESSING METHOD AND APPARATUS BASED ON ARTIFICIAL INTELLIGENCE, ELECTRONIC DEVICE, COMPUTER PROGRAM PRODUCT, AND COMPUTER-READABLE STORAGE MEDIUM" filed on Sep. 29, 2022, which is based on and claims priority to Chinese Patent Application No. 202111421900.X, entitled "AUDIO PROCESSING METHOD AND APPARATUS BASED ON ARTIFICIAL INTELLIGENCE, ELECTRONIC DEVICE, COMPUTER PROGRAM PRODUCT, AND COMPUTER-READABLE STORAGE MEDIUM" filed on Nov. 26, 2021, all of which is incorporated by reference in its entirety.

FIELD OF THE TECHNOLOGY

This application relates to the field of artificial intelligence technologies, and in particular, to an audio processing method and apparatus based on artificial intelligence, an electronic device, a computer program product, and a computer-readable storage medium.

BACKGROUND OF THE DISCLOSURE

Artificial intelligence (AI) involves a theory, a method, a technology, and an application system that use a digital computer or a machine controlled by the digital computer to simulate, extend, and expand human intelligence, perceive an environment, obtain knowledge, and use knowledge to obtain an optimal result.

More and more AI products have a voice interaction function. The voice interaction may be applied to various speech scoring systems, such as language test systems and oral test systems for language education applications. In order to normally use the voice interaction function, it is necessary to align phonemes with a text, and improve the alignment accuracy as far as possible. However, in related technologies, the phonemes cannot be accurately aligned with the text.

SUMMARY

Embodiments of this application provide an audio processing method and apparatus based on artificial intelligence, an electronic device, a computer program product, and a computer-readable storage medium, which can improve the alignment accuracy of phonemes.

Technical schemes in the embodiments of this application are implemented as follows:

An embodiment of this application provides an audio processing method performed by an electronic device, the method including:

determining a phoneme feature of at least one phoneme of a given text;
determining an audio feature of an audio frame in audio data corresponding to the given text;
performing the following processing for the audio frame:
obtaining a weight of the phoneme feature of the at least one phoneme based on a mapping relationship between the phoneme feature of the at least one phoneme and the audio feature of the audio frame, and fusing the audio feature of the audio frame and the phoneme feature of the at least one phoneme based on the weight of the phoneme feature of the at least one phoneme to obtain a fused feature of the audio frame; and
determining a start time and a stop time of a phoneme in the audio data based on the fused feature of the audio frame.

An embodiment of this application provides an electronic device, including:

a memory, configured to store an executable instruction; and
a processor, configured to implement, when executing the computer-executable instruction stored in the memory, the audio processing method based on artificial intelligence provided by the embodiments of this application.

An embodiment of this application provides a non-transitory computer-readable storage medium, storing a computer-executable instruction, the computer-executable instruction, when executed by a processor of an electronic device, causing the electronic device to implement the audio processing method based on artificial intelligence provided by the embodiments of this application.

The embodiments of this application have the following beneficial effects:

According to the embodiments of this application, the weight of each phoneme in a text sequence is determined based on the audio feature, and then the phoneme feature, the audio feature, and the text sequence are fused based on the weight of each phoneme to obtain the fused feature, so that the fused feature can effectively represent a relationship between the audio frame and the phoneme. Then phoneme classification is performed on each audio frame in the audio based on the fused feature, which can effectively improve the classification accuracy, thereby improving the alignment accuracy of the phonemes.

DESCRIPTION OF EMBODIMENTS

Figure 1:
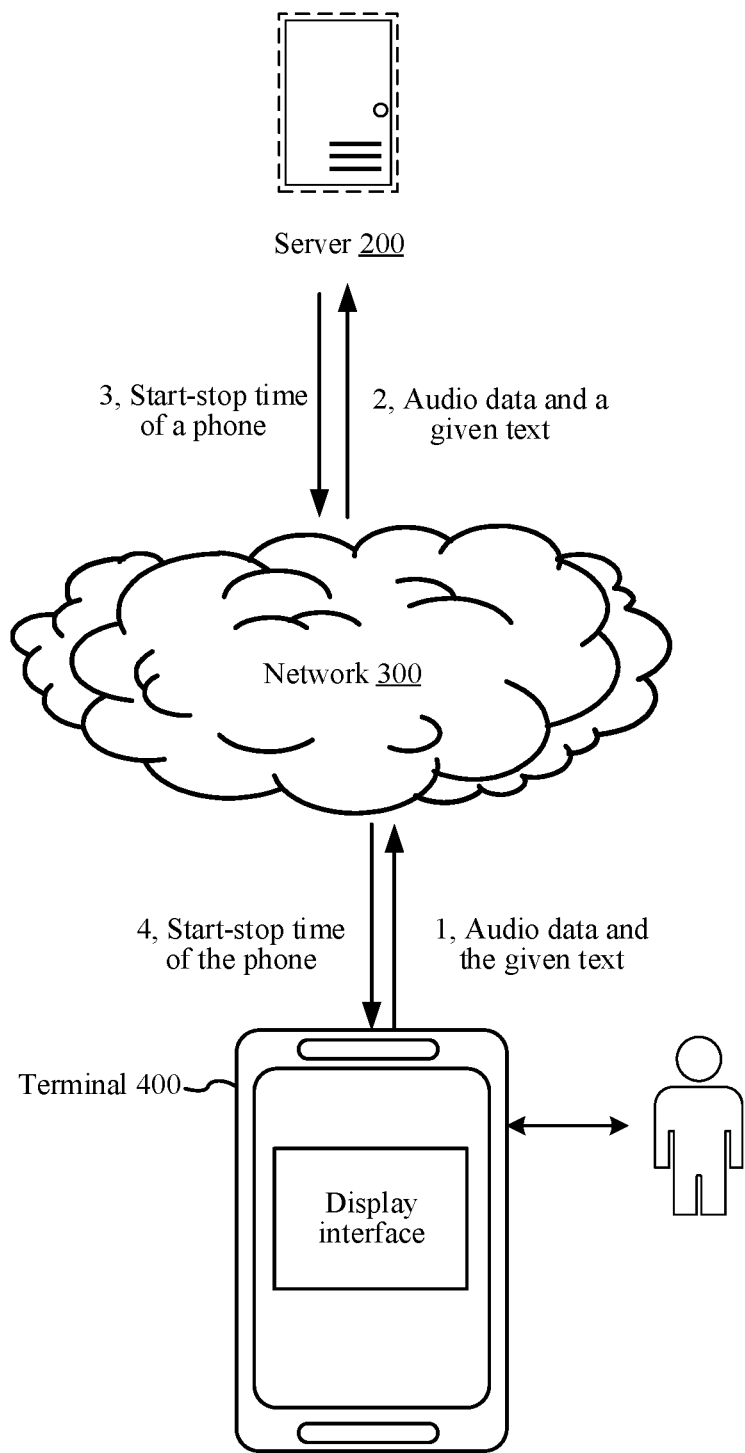
FIG. 1 is a schematic structural diagram of an audio processing system based on artificial intelligence according to an embodiment of this application.

To make the objectives, technical schemes, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

The terms, involved in the following description, "first/second/third" are merely intended to distinguish similar objects rather than describing specific orders. It may be understood that, "first/second/third" is interchangeable in proper circumstances to enable the embodiments of this application to be implemented in other orders than those illustrated or described herein.

Unless otherwise defined, meanings of all technical and scientific terms used in this specification are the same as those usually understood by a person skilled in the art to which this application belongs. Terms used in the specification of this application are merely intended to describe objectives of the specific embodiments, but are not intended to limit this application.

Before the embodiments of this application are further described in detail, a description is made on nouns and terms in the embodiments of this application, and the nouns and terms in the embodiments of this application are applicable to the following explanations.

1) Speech recognition technology: Automatic speech recognition (ASR) aims at converting lexical content in human speeches into computer-readable inputs, such as key presses, binary codes, or character sequences.

2) Hidden Markov model (HMM): HMM is a statistical model configured to describe a Markov process with hidden unknown parameters.

3) Maximum likelihood estimation (MLE): MLE is a method for estimating parameters of a probability model.

4) Discrimination model: The discrimination model is a method for modeling a relationship between unknown data y and known data x in a machine learning field. The discrimination model is a method based on a probability theory. With a known input variable x, the discrimination model constructs a condition probability distribution $P(y|x)$ to predict y.

5) Full connection (FC): Each neuron in a full connection layer is fully connected with all neurons in a previous layer. The full connection layer may integrate local information with category discrimination in a convolution layer or a pooling layer.

6) Pearson correlation coefficient: In statistics, the Pearson correlation coefficient is used for measuring linear correlation between two variables X and Y, and the value of the Person correlation coefficient is between −1 and 1.

7) Support vector machine (SVM): In machine learning, SVM is usually referred to as a support vector network, and is a supervised learning model for analyzing data in classification and regression analysis.

8) Phone: the phoneme is a minimal speech unit classified according to natural attributes of the speech. It is analyzed according to a pronunciation action in a syllable that a pronunciation action is used as a phoneme. The phonemes are classified into vowels and consonants. In the embodiments of this application, the phonemes also include mute phonemes. For example, an audio frame is mute, that is, the audio frame corresponds to the mute phonemes.

9) Phone alignment refers to aligning phonemes with audios, that is, determining a start time and a stop time of each phoneme in a given text.

In related technologies, there are two phoneme alignment methods: one method does not depend on the given text, and the other one depends on the text. The method that does not depend on the text usually classifies phoneme boundaries, determines whether the time of an audio frame in audio data is the phoneme boundary. For example, the Viterbi algorithm is used for distinguishing a pronunciation segment and a non-pronunciation segment, or a recurrent neural network is used for classifying the phoneme boundaries. The method depending on the text usually uses HMM to obtain a most possible sequence based on the maximum likelihood, or uses the discrimination model, or designs an alignment function and uses the support vector machine to perform the phoneme alignment.

In related technologies, the HMM-based alignment method mainly takes the phoneme boundary determination as a hidden state, adopts the maximum likelihood for optimization, and does not directly and explicitly optimize the phoneme alignment. In the related technologies, other phoneme alignment methods need to design an artificial alignment function, and perform the artificial feature engineering.

An embodiment of this application provides an audio processing method based on artificial intelligence, which can automatically learn a mapping relationship between a phoneme sequence and audio data based on a neural network including an attention mechanism without depending on the artificial alignment function, explicitly optimize a loss function at a training stage, combine various tasks to perform the training, and perform constrained learning by using the loss function at an attention processing stage, thereby effectively improving the alignment accuracy of the phonemes.

For the above problems in the related technologies, the embodiments of this application provide an audio processing method and apparatus based on artificial intelligence, an electronic device, a computer program product, and a computer-readable storage medium, which can perform attention mechanism calculation on an audio feature and a text sequence to obtain a fused feature, so that the phoneme classification is performed on each frame in the audio based on the fused feature, thereby effectively improving the classification accuracy, and improving the alignment accuracy of the phonemes.

The following describes an exemplary application of an electronic device provided by the embodiment of this application. The electronic device provided by the embodiment of this application may be implemented as a server. The following describes an exemplary application of the electronic device that is implemented as the server.

Referring to FIG. 1, FIG. 1 is a schematic structural diagram of an audio processing system based on artificial intelligence according to an embodiment of this application. The audio processing system may be applied to an oral test scenario. In the audio processing system, a terminal 400 is connected to a server 200 through a network 300. The network may be a wide area network or a local area network, or a combination of the two.

In some embodiments, functions of the audio processing system are implemented by various modules in the server 200. In a process that the terminal 400 is used by a user, the terminal 400 receives audio data of the user for a given text. The terminal 400 transmits the audio data and the given text to the server 200. The server 200 determines a phoneme feature of each phoneme in the given text and an audio feature of each audio frame in the audio data, and performs the following processing for each audio frame: the audio feature of the audio frame is mapped to obtain a weight of the phoneme feature of each phoneme, the audio feature of the audio frame and the phoneme feature of at least one phoneme are fused based on the weight of the phoneme feature of each phoneme to obtain a fused feature of the audio frame, a phoneme corresponding to each audio frame is determined, a start time and a stop time of each phoneme is determined based on the phoneme corresponding to each audio frame, and the start time and stop time of each phoneme is transmitted to the terminal 400, so that the terminal 400 directly presents the start time and stop time of each phoneme to complete the phoneme alignment process.

By taking the application of the audio processing system in the oral test scenario as an example, oral test questions require the user to read the given text in English. The terminal 400 receives the audio data of the user corresponding to the given text. The terminal 400 transmits the audio data to the server 200. The server 200 maps the audio feature of the audio frame to obtain the weight of the phoneme feature of each phoneme, fuses the audio feature of the audio frame and the phoneme feature of at least one phoneme based on the weight of the phoneme feature of each phoneme to obtain the fused feature of each audio frame, determines the phoneme corresponding to each audio frame based on the fused feature of each audio frame, determines the start time and stop time of each phoneme based on the phoneme corresponding to each audio frame, and transmits the start time and stop time to the terminal 400, so that the terminal 400 directly presents the start time and stop time of each phoneme. In response to a scoring operation of the user, the terminal 400 may display a scoring result for each phoneme. The user participating in reading and the user performing the scoring may be same or different.

By taking the application of the audio processing system in an oral practice scenario as an example, oral practice questions require the user to read the given text in English. The terminal 400 receives the audio data of the user corresponding to the given text. The terminal 400 transmits the audio data to the server 200. The server 200 maps the audio feature of the audio frame to obtain the weight of the phoneme feature of each phoneme, fuses the audio feature of the audio frame and the phoneme feature of at least one phoneme based on the weight of the phoneme feature of each phoneme to obtain the fused feature of each audio frame, determines the phoneme corresponding to each audio frame based on the fused feature of each audio frame, determines the start time and stop time of each phoneme based on the phoneme corresponding to each audio frame, and transmits the start time and stop time to the terminal 400, so that the terminal 400 directly presents the start time and stop time of each phoneme. In response to a playback operation of the user for each phoneme, the terminal 400 may independently play the audio frame corresponding to the phoneme.

As an alternative scheme of the above example that the server 200 performs the phoneme alignment, the terminal may be used for mapping the audio feature of the audio frame to obtain the weight of the phoneme feature of each phoneme, fusing the audio feature of the audio frame and the phoneme feature of the at least one phoneme based on the weight of the phoneme feature of each phoneme to obtain the fused feature of the audio frame, determining the phoneme corresponding to each audio frame based on the fused feature of each audio frame, determining the start time and stop time of each phoneme based on the phoneme corresponding to each audio frame, and directly presenting the start time and stop time of each phoneme.

In some embodiments, the server 200 may be an independent physical server, a server cluster or a distributed system composed of a plurality of physical servers, or a cloud server providing basic cloud computing services such as cloud servers, cloud databases, cloud computing, cloud functions, cloud storage, network services, cloud communications, middleware services, domain name services, security services, CDN, big data, artificial intelligence platforms, and the like. The terminal may be a smart phoneme, a tablet computer, a notebook computer, a desktop computer, a smart speaker, a smart watch, an intelligent voice interaction device, intelligent appliances, vehicle-mounted terminals, and the like, but is not limited thereto. The terminal and the server may be connected directly or indirectly through a wired or wireless communication way, which is not limited in the embodiments of this application.

In some embodiments, the terminal or the server may run a computer program to implement the audio processing method provided by the embodiments of this application. For example, the computer program may be a native program or software module in an operating system; a native application (APP), i.e., the program that can be run only being installed in the operating system, such as oral test APP or oral learning APP; a small program, i.e., the program that may be run only after being downloaded into a browser environment; or small programs that can be embedded in any APP. In general, the computer program may be any form of application, module, or plug-in.

Figure 2:
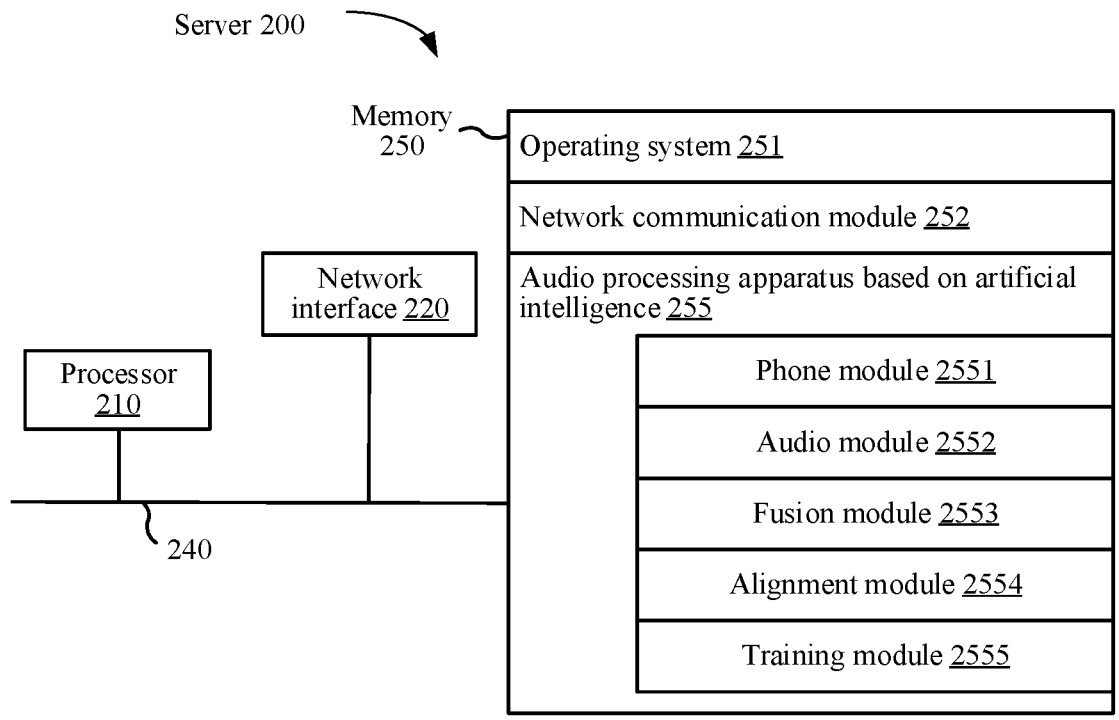
FIG. 2 is a schematic structural diagram of an electronic device according to an embodiment of this application.

A structure of an electronic device for implementing the audio processing method based on artificial intelligence provided by the embodiments of this application is described below. The electronic device provided by the embodiments of this application may be a server 200 in FIG. 1. Referring to FIG. 2, FIG. 2 is a schematic structural diagram of a server 200 according to an embodiment of this application. The server 200 shown in FIG. 2 includes: at least one processor 210, a memory 250 and at least one network interface 220. All components in the server 200 are coupled together by using a bus system 240. It may be understood that, the bus system 240 is configured to implement connection and communication between the components. In addition to a data bus, the bus system 240 further includes a power bus, a control bus, and a state signal bus. However, for ease of clear description, all types of buses in FIG. 2 are marked as the bus system 240.

The processor 210 may be an integrated circuit chip with signal processing capacity such as a general processor, a digital signal processor (DSP), another programmable logic device, discrete gate or transistor logic device, or discrete hardware assembly, or the like. The general processor may be a microprocessor or any conventional processor, and the like.

The memory 250 may be removable, irremovable or a combination thereof. The exemplary hardware device includes a solid memory, a hard disk drive, an optical disk drive, and the like. The memory 250 includes one or more storage devices that are physically away from the processor 210.

The memory 250 includes a volatile memory or a non-volatile memory, or may include both the volatile memory and the non-volatile memory. The non-volatile memory may be a read only memory (ROM), and the volatile memory may be a random access memory (RAM). The memory 250 described in the embodiment of this application aims at including any other suitable type of memories.

In some embodiments, the memory 250 can store data to support various operations. An example of these data includes a program, a module, and a data structure or a subset or a superset, which may be described exemplarily.

An operating system 251 includes system programs for processing various basic system services and executing hardware-related tasks, such as a frame layer, a core library layer, a drive layer, and the like, which is used for implementing various basic services and processing hardware-based tasks. A network communication module 252 is configured to reach other computing devices via one or more (wired or wireless) network interfaces 220. The exemplary network interface 220 includes: Bluetooth, a wireless fidelity (WiFi), universal serial bus (USB), and the like.

In some embodiments, the audio processing apparatus based on artificial intelligence provided by the embodiments of this application may be implemented by a software method. FIG. 2 shows an audio processing apparatus 255 based on artificial intelligence stored in the memory 250, which may be software in the form of programs, plug-ins, and the like, including the following software modules: a phoneme module 2551, an audio module 2552, a fusion module 2553, an alignment module 2554, and a training module 2555. These modules are logic modules, which may be arbitrarily combined or further disassembled according to to-be-implemented functions. The functions of each module may be described below.

The audio processing method based on artificial intelligence provided by the embodiments of this application may be described in combination with exemplary application and implementation of the server 200 provided by the embodiments of this application.

Figure 6:
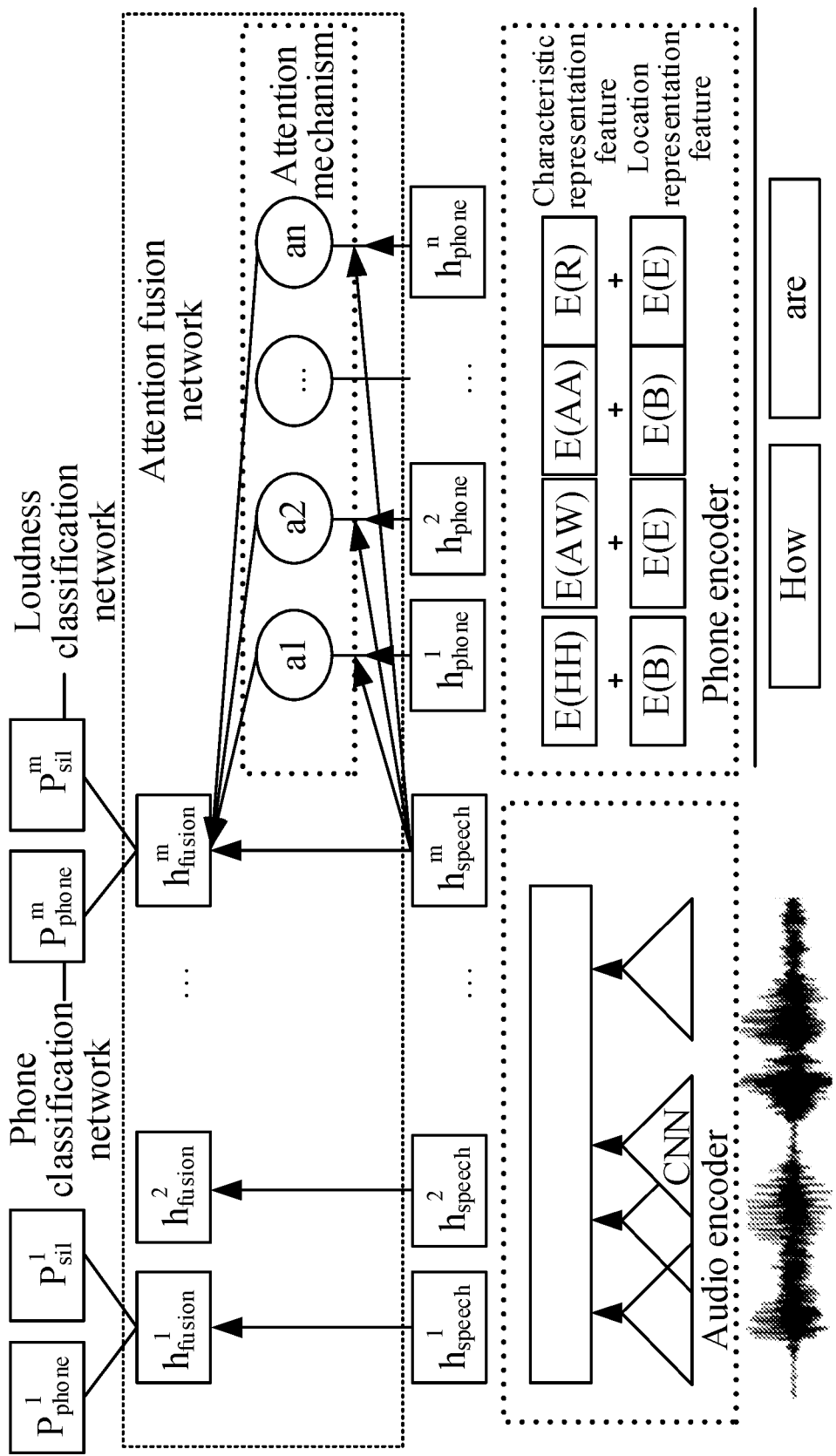
FIG. 6 is a schematic structural diagram of a phoneme alignment model of an audio processing method based on artificial intelligence according to an embodiment of this application.

Referring to FIG. 6, FIG. 6 is a schematic structural diagram of a phoneme alignment model of an audio processing method based on artificial intelligence provided by the embodiments of this application. A phoneme alignment model includes an attention fusion network, a phoneme classification network (corresponding to a first task), and a loudness classification network (corresponding to a second task). The attention fusion network is configured to fuse a phoneme feature and an audio feature, so that the fused feature outputted by the attention fusion network is shared by the loudness classification network corresponding to the first task and the phoneme classification network corresponding to the second task. Inputs of the attention fusion network are the audio feature based on the audio data and the phoneme feature based on the given text. An output of the attention fusion network is the fused feature of the audio feature and the phoneme feature. Then the fused features are fully connected respectively by the loudness classification network and the phoneme classification network to respectively obtain a loudness classification result and a phoneme classification result. The loudness classification network may be a structure of a full connection layer. The phoneme classification network may also be a structure of the full connection layer. However, the loudness classification network and the phoneme classification network are different in parameters. The first task is to recognize the phoneme of a certain audio frame from a plurality of candidate phonemes. The second task is to determine whether the audio frame is a mute audio frame.

Figure 7:
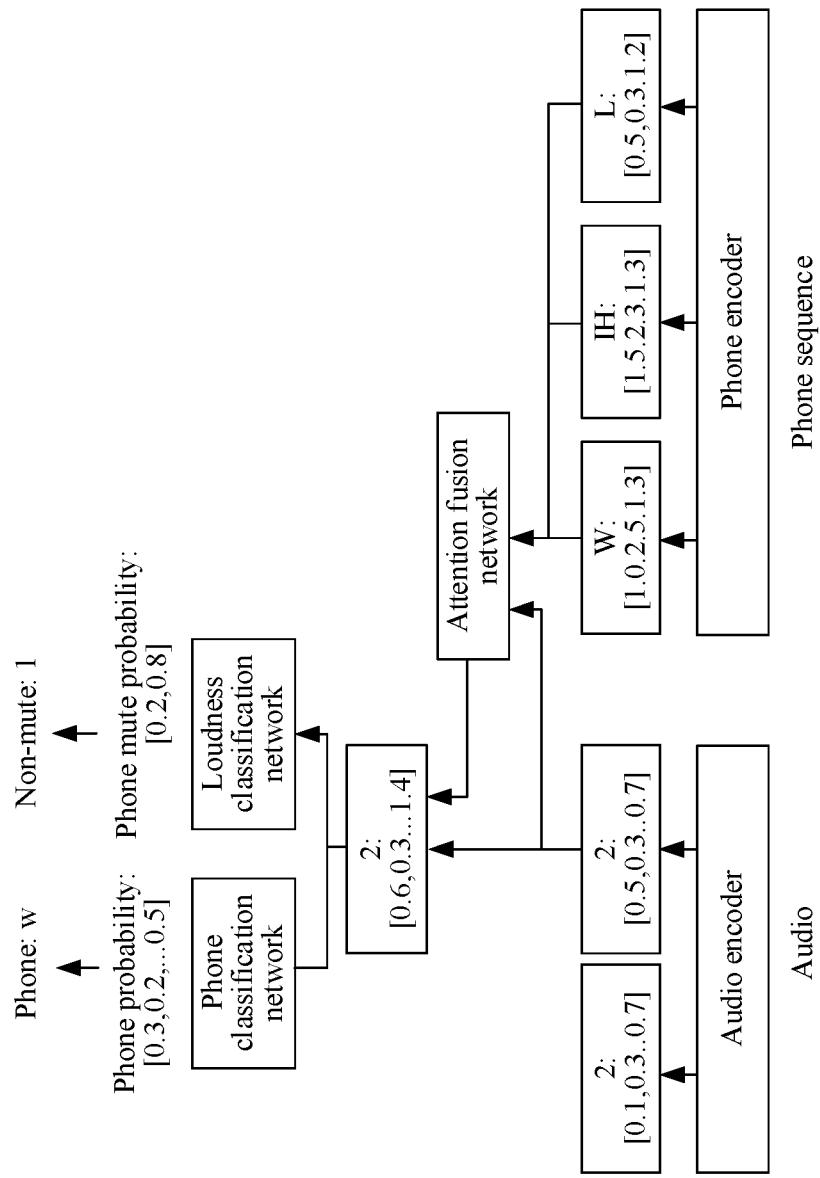
FIG. 7 is a data flowchart of an audio processing method based on artificial intelligence according to an embodiment of this application.

Referring to FIG. 6, the phoneme alignment model includes the attention fusion network, the phoneme classification network (corresponding to the first task), and the loudness classification network (corresponding to the second task). Referring to FIG. 7, FIG. 7 is a data flowchart of an audio processing method based on artificial intelligence according to an embodiment of this application. An input of the audio encoder is audio data. An output of the audio encoder is the audio feature (in a vector form) of each audio frame included in the audio data. An input of the phoneme encoder is the phoneme sequence (given text). An output of the phoneme encoder is the phoneme feature (a data form of the phoneme feature is a vector) of each phoneme. An input of the attention fusion network is an output of the audio encoder and an output of the phoneme encoder. An output of the attention fusion network is the fused feature of the phoneme feature and audio feature. The fused features are classified respectively by the parallel phoneme classification network and loudness classification network. The phoneme classification network outputs a probability that each audio frame belongs to each candidate phoneme. The loudness classification network outputs the probability that each audio frame belongs to a loudness category. The loudness categories include mute and non-mute, for example, a non-mute identifier is 1, a mute identifier is 0, and the candidate phonemes are W, IH, L, and the like.

By taking the server 200 in FIG. 1 performing the audio processing method based on artificial intelligence according to an embodiment of this application as an example, the audio processing method based on artificial intelligence provided by the embodiments of this application is described.

Figure 3A:
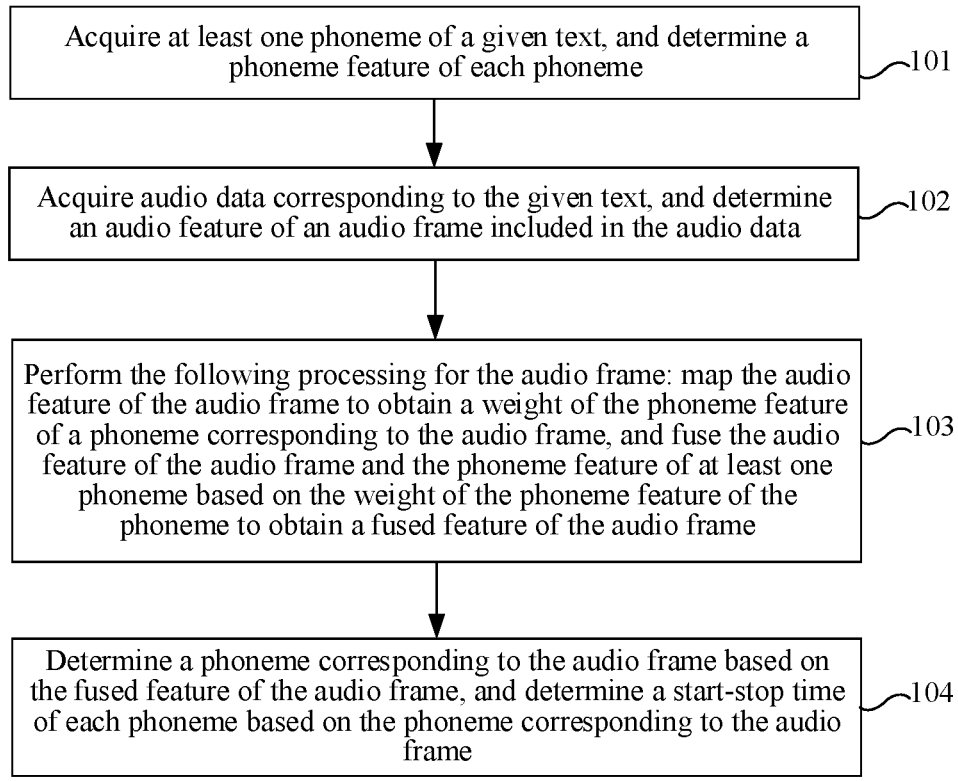
FIG. 3A to FIG. 3C are flowcharts of an audio processing method based on artificial intelligence according to an embodiment of this application.

Referring to FIG. 3A, FIG. 3A is a flowchart of an audio processing method based on artificial intelligence according to an embodiment of this application. Description is performed in combination with step 101 to step 104 shown in FIG. 3A.

Step 101: Acquire at least one phoneme of a given text, and determine a phoneme feature of each phoneme.

In some embodiments, the determining the phoneme feature of each phoneme is implemented by invoking the phoneme encoder. The phoneme encoder includes a phoneme feature representation network and a phoneme location representation network. In step 101, the phoneme feature of each phoneme is determined, which may be implemented by the following technical schemes: the following processing is performed for each phoneme: characteristic representation features of the phoneme are determined by a phoneme characteristic representation network, and the characteristic representation feature is used for representing characteristics of the phoneme; location representation features of the phoneme are determined by the phoneme location representation network, and the location representation feature is used for representing a location of the phoneme in a corresponding text unit; and the location representation feature is added with the characteristic representation feature to obtain the phoneme feature of the phoneme.

As an example, the phoneme characteristic representation network and the phoneme location representation network are in a parallel relationship. Both the phoneme characteristic representation network and the phoneme location representation network are convolution neural networks. The two convolution neural networks include different numbers of convolution layers, and each convolution layer is different in parameters. The phoneme is convolved by a plurality of cascaded convolution layers in the phoneme characteristic representation network to obtain the characteristic representation feature of the phoneme. The audio frame is convolved by a plurality of cascaded convolution layers in the phoneme location representation network to obtain location representation characteristics of the audio frame.

As an example, different languages contain different phonemes. By taking English as an example, when the given text is ever forget, the phonemes of the given text include EH1, V, ER, sp, F, R, G, EH, and T. EH1, V, ER, F, R, G, EH, and T are different phonemes, and sp represents the mute phoneme that is also one of candidate phonemes. Each phoneme is coded by the phoneme characteristic representation network to obtain the characteristic representation feature of each phoneme, such as E(HH) shown in FIG. 6. Different phonemes are different in characteristic representation features, and the characteristics include pronunciation characteristics, meaning characteristics, and the like. The characteristic representation feature is used for distinguishing different phonemes. The characteristic representation feature represents the characteristics of the phoneme. Each phoneme has four location possibilities in the corresponding text unit. The text unit is a minimal unit of a sentence. For example, in English, the text unit (How) of the given text (How are) shown in FIG. 6 is a word. When a word contains a plurality of phonemes, the word has a beginning location (B), an intermediate location (I) and an end location (E) of the phonemes. When a word contains one phoneme, S is used for indicating the location of the phoneme. The location of the phoneme in the corresponding text unit is coded by the phoneme location representation network to obtain the location representation feature of each phoneme. The location representation feature represents the location of the phoneme in the corresponding text unit, such as E(B) shown in FIG. 6. Finally, the unique characteristic representation feature (a vector for representing the characteristics of the phoneme) is added with the location representation feature (a vector for representing the location of the phoneme) to obtain a final phoneme feature. By using the phoneme coding method, the characteristic difference of each phoneme can be represented effectively, and the different locations of the same phoneme can also be represented effectively.

Step 102: Acquire audio data corresponding to the given text, and determine an audio feature of an audio frame included in the audio data that may include one or more audio frames.

Figure 9:
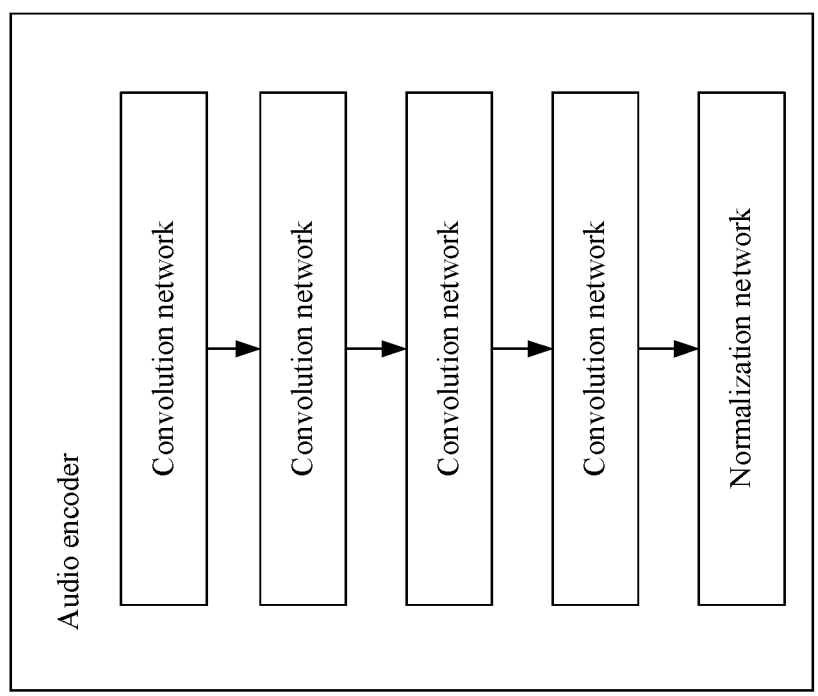
FIG. 9 is a schematic structural diagram of an audio encoder according to an embodiment of this application.

In some embodiments, referring to FIG. 9, FIG. 9 is a schematic structural diagram of an audio encoder according to an embodiment of this application. The audio encoder shown in FIG. 9 includes a plurality of cascaded convolution networks and a normalization network. In step 102, the audio feature of the audio frame included in the audio data is determined, which may be implemented by the following technical schemes: feature extraction is performed on at least one audio frame by using a plurality of cascaded convolution networks included in the audio encoder to obtain a convolution feature extraction result corresponding to each audio frame; and the convolution feature extraction result of each audio frame is normalized by the normalization network included in the audio encoder to obtain the audio feature of each audio frame.

As an example, the audio feature is acquired based on the audio encoder. Feature extraction is performed on at least one audio frame as a whole by using a plurality of cascaded convolution networks. When there are a plurality of audio frames, outputs of the plurality of convolution networks are low-frequency feature representations. For example, 16 kHz audio data of about 30 ms is coded, and one low-frequency feature representation may be generated every set time step length, so that the convolution feature extraction result of each audio frame is obtained. The convolution feature extraction result of each audio frame is normalized by the normalization network to obtain the audio feature of each audio frame. The audio encoder may be of a wav2vec network structure, and parameters of the audio encoder are obtained by training the wav2vec-based network structure.

wav2vec is a convolution neural network. The convolution neural network includes a coding network. The coding network is of a five-layer convolution structure. The convolution neural network also includes a content network. The content network is a nine-layer convolution structure.

Step 103: Perform the following processing for the audio frame: the audio feature of the audio frame is mapped to obtain a weight of the phoneme feature of a phoneme corresponding to the audio frame, and the audio feature of the audio frame and the phoneme feature of the at least one phoneme are fused based on the weight of the phoneme feature of each phoneme to obtain the fused feature of the audio frame.

In some embodiments, step 103 is implemented by the attention fusion network. The attention fusion network includes an attention layer and a fusion layer. In step 103, the audio feature of the audio frame is mapped to obtain the weight of the phoneme feature of each phoneme, which may be implemented by the following technical schemes: query vector transformation is performed on the audio feature to obtain a query vector; key vector transformation is performed on the phoneme feature to obtain a key vector; the query vector is multiplied with transpose of the key vector to obtain a multiplication result; a square root of a dimension of the key vector is acquired; a ratio of the multiplication result to the square root is determined as an attention feature; and maximum likelihood processing is performed for the attention feature to obtain the weight of the corresponding phoneme. The weight corresponding to each phoneme is acquired based on the audio feature of the audio frame, and correlation information between the phoneme and the audio frame may be acquired, so that the subsequent alignment accuracy is improved.

As an example, the query vector transformation may be implemented by the following method: by multiplying a first parameter Wq of the attention layer with the audio feature, the query vector Q may be obtained, or, the first parameter Wq of the attention layer is multiplied with the audio feature to obtain a first multiplication result, and by adding the first multiplication result with a fourth parameter Bq, the query vector Q may be obtained; the key vector transformation may be implemented by the following method: by multiplying a second parameter Wk of the attention layer with the audio feature, the key vector K may be obtained, or, the second parameter Wk of the attention layer is multiplied with the phoneme feature to obtain a second multiplication result, and by adding the second multiplication result with a fifth parameter Bk, the query vector K may be obtained. All the first parameter, the second parameter, the fourth parameter, and the fifth parameter of the attention layer are obtained by training the attention fusion network.

As an example, the phoneme feature and the audio feature are fused by an attention mechanism, and the attention mechanism is used for modeling a relationship between the query vector Q, the key vector K, and a value vector V, referring to formula (1) and formula (2):

$$AttentionScore(Q, K) = \text{softmax}\left(\frac{QK^T}{\sqrt{d_k}}\right); \quad (1)$$

$$Attention(Q, K, V) = AttentionScore(Q, K) * V; \quad (2)$$

where the query vector Q is obtained based on the audio feature $h_{speech}^i$ of each audio frame, the key vector K of each phoneme and the value vector V of each phoneme are obtained based on the phoneme feature $H_{phone}$ of each phoneme of the given text, the audio feature $h_{speech}^i$ of each audio frame may also be used as the query vector, the phoneme feature $H_{phone}$ of each phoneme of the given text may be used as the key vector K of each phoneme and the value vector V of each phoneme, AttentionScore(Q,K) is the weight of each phoneme, Attention(Q,K,V) is an attention result of each phoneme, and $d_k$ is the dimension of the key vector K.

As an example, query vector transformation is performed on the audio feature $h_{speech}^i$ of each audio frame to obtain the query vector Q, key vector transformation is performed on the phoneme feature $H_{phone}$ of each phoneme of the given text to obtain the key vector K, and value vector transformation is performed on the phoneme feature $H_{phone}$ of each phoneme of the given text to obtain the value vector V. The parameters involved in the transformation may be obtained by integrally training the phoneme alignment model. The audio feature $h_{speech}^i$ of each audio frame may also be used as the query vector, or the phoneme feature $H_{phone}$ of each phoneme of the given text may also be used as the key vector K of each phoneme and the value vector V of each phoneme.

Figure 3B:
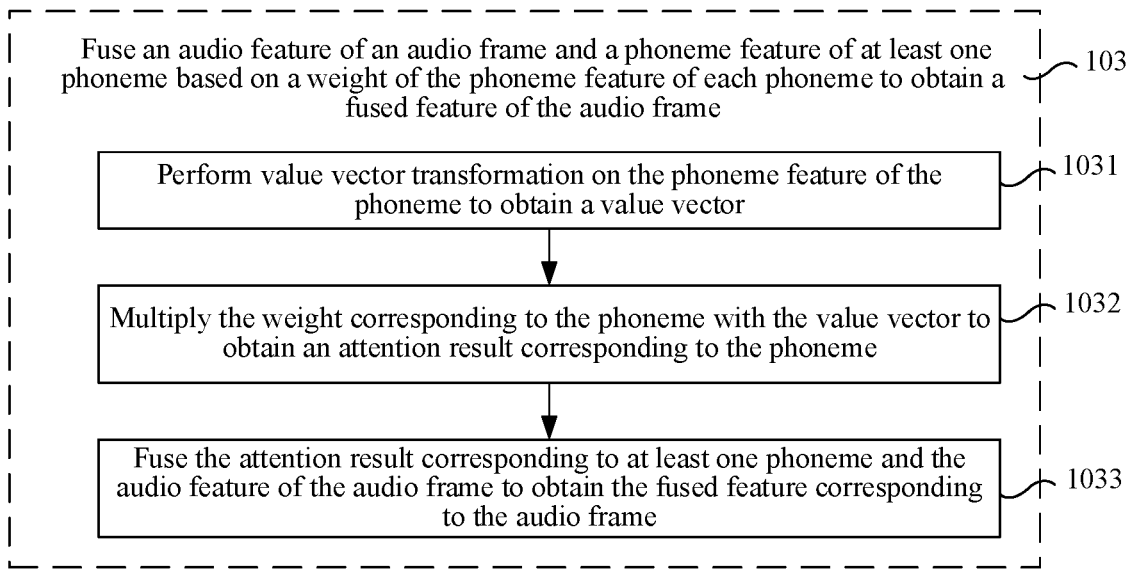

In some embodiments, step 103 is implemented by the attention fusion network. The attention network includes the attention layer and the fusion layer. Referring to FIG. 3B, FIG. 3B is a flowchart of an audio processing method based on artificial intelligence according to an embodiment of this application. In step 103, the audio feature of the audio frame and the phoneme feature of at least one phoneme are fused based on the weight of the phoneme feature of each phoneme to obtain the fused feature of each audio frame, which may be described by performing step 1031 to step 1033 shown in FIG. 3B for each phoneme.

Step 1031: Perform value vector transformation on the phoneme feature of the phoneme to obtain the value vector.

Step 1032: Multiply the weight of the corresponding phoneme with the value vector to obtain the attention result of the corresponding phoneme.

Both step 1031 and step 1032 are implemented by the attention layer in the attention fusion network, and the value vector transformation may be implemented by the following method: by multiplying a third parameter Wv of the attention layer with the phoneme feature, the value vector V may be obtained, or, the third parameter Wv of the attention layer is multiplied with the phoneme feature to obtain a third multiplication result, and then by adding the third multiplication result with a sixth parameter By, the value vector V may be obtained; and both the third parameter and the sixth parameter of the attention layer are obtained by training the attention fusion network.

Step 1033: Fuse the attention result corresponding to at least one phoneme and the audio feature of the audio frame to obtain the fused feature corresponding to the audio frame.

As an example, step 103 is implemented by invoking the attention fusion network. The attention fusion network includes the attention layer and the fusion layer. Fusion is actually a feature splicing process, and is to splice the attention result based on a certain audio frame with the audio feature of the audio frame to obtain the fused feature corresponding to the audio frame, referring to formula (3):

$$h_{fusion}^i = [Attention(h_{speech}^i, H_{phone}), h_{speech}^i] \quad (3);$$

where $Attention(h_{speech}^i, H_{phone})$ is the attention result of the audio frame i, the attention result of the audio frame i is a matrix, each column in the matrix represents the attention result of each of all phonemes and the audio frame i, $h_{speech}^i$ is the audio feature of the audio frame i, $H_{phone}$ is the phoneme feature of all phonemes of the given text, and $h_{fusion}^i$ is the fused feature corresponding to each audio frame.

As an example, the attention mechanism originates from the research on the human vision. In cognition science, due to the bottleneck of information processing, people may selectively pay attention to part of all information, while ignoring other visible information. The attention mechanism includes a soft attention mechanism (that may be classified into item-wise soft attention and location-wise soft attention), a hard attention mechanism (that may be classified into item-wise hard attention and location-wise hard attention), and an auto-attention mechanism (that is a variable of the attention mechanism, which reduces the dependence on external information, and is better at capturing internal correlation of data or features. An application of the auto-attention mechanism in text is mainly to calculate mutual influence between words to solve the long-distance dependence problem). The attention mechanism mainly has two aspects: to decide which part of the input needs to be paid attention to; and to allocate limited information processing resources to an important part. In depth learning, the attention may be realized by weight. The correlation between the audio frame and each phoneme is determined by the weight. For different audio frames, the attention of the audio frame on the same phoneme is different, so that when the audio feature of the audio frame is fused with the phoneme feature of a plurality of phonemes, the weight of the phoneme feature may be different.

Step 104: Determine the phoneme corresponding to an audio frame based on the fused feature of the audio frame, and determine a start time and a stop time of a phoneme based on the phoneme corresponding to the audio frame.

In some embodiments, the phoneme corresponding to each audio frame is determined by invoking the phoneme classification network. The phoneme classification network shown in FIG. 6 includes at least one cascaded phoneme full connection layer. In step 104, based on the fused feature of each audio frame, the phoneme corresponding to each audio frame is determined, which may be implemented by the following technical schemes: the following processing is performed on each audio frame: first full connection is performed on the fused feature by using a phoneme full connection layer when the number of the phoneme full connection layer is one to obtain a first probability that the audio frame belongs to each candidate phoneme; the first full connection is performed on an input of an $n^{th}$ phoneme full connection layer by using the $n^{th}$ phoneme full connection layer in N cascaded phoneme full connection layers when the number of the phoneme full connection layers is multiple, and an $n^{th}$ phoneme full connection result outputted by the $n^{th}$ phoneme full connection layer is transmitted to a $(n+1)^{th}$ phoneme full connection layer so as to continue the first full connection to obtain a $(n+1)^{th}$ phoneme full connection result corresponding to the $(n+1)^{th}$ phoneme full connection layer; and N is an integer greater than or equal to 2, n is an integer variable that increases gradually from 1, a value range of n is that $1 \leq n < N$, when the value of n is 1, the input of the $n^{th}$ phoneme full connection layer is the fused feature, when the value of n is $2 \leq n < N$, the input of the $n^{th}$ phoneme full connection layer is a $(n-1)^{th}$ phoneme full connection result outputted by a $(n-1)^{th}$ phoneme full connection layer, and when the value of n is N-1, the $(n+1)^{th}$ phoneme full connection result is the first probability that the audio frame belongs to each candidate phoneme. The candidate phoneme with the maximum first probability is determined as the phoneme corresponding to the audio frame.

As an example, referring to FIG. 6, the phoneme classification network (the phoneme full connection layer) is externally connected behind the attention fusion network. Phone classification is performed on each audio frame by using the phoneme classification network. The candidate phonemes contain 40 phonemes in total (including 39 phonemes in a phoneme dictionary and a mute phoneme). When there is only one phoneme full connection layer, the first probability that a certain audio frame belongs to each candidate phoneme is outputted by the phoneme full connection layer, that is, 40 first probabilities are outputted for the audio frame A. The candidate phoneme corresponding to the maximal first probability is determined as the phoneme of the audio frame A. When there are a plurality of phoneme full connection layers, due to the cascaded relationship, deeper feature may be learned by the plurality of cascaded full connection layers, so that the subsequent recognition accuracy of the phoneme is improved effectively.

In some embodiments, in step 104, based on the phoneme corresponding to each audio frame, the start time and stop time of each phoneme is determined, which may be implemented by the following technical schemes: based on the phoneme corresponding to each audio frame, at least one audio frame corresponding to each phoneme is determined; the following processing is performed for each phoneme: the start time and stop time of consecutive audio frames corresponding to the phoneme is determined as the start time and stop time of the phoneme when the phoneme corresponds to a plurality of consecutive audio frames; and the time of the audio frame corresponding to the phoneme is determined as the start time and stop time of the phoneme when the phoneme corresponds to one audio frame.

As an example, the start time and stop time includes a start time and a stop time of the phoneme. By taking the existence of 10 audio frames as an example for description, based on the phoneme corresponding to each audio frame, at least one audio frame corresponding to each phoneme is determined, and the following processing is performed for each phoneme: when the phoneme corresponds to a plurality of consecutive audio frames, the start time and stop time of the consecutive audio frames corresponding to the phoneme is determined as the start time and stop time of the phoneme. For example, the first audio frame to the third audio frame all correspond to the phoneme W, so that the phoneme W corresponds to the first audio frame to the third audio frame. The start-stop time of the first audio frame to the third audio frame is determined as the start time and stop time of the phoneme W, that is, the time of the first audio frame is determined as the start time of the start time and stop time, and the time of the third audio frame is determined as the stop time of the start time and stop time. When the phoneme corresponds to one audio frame, the time of the audio frame corresponding to the phoneme is determined as the start time and stop time of the phoneme. For example, the first audio frame corresponds to the phoneme W, and the second audio frame corresponds to the mute audio frame, so that the phoneme W corresponds to the first audio frame. The start-stop time of the first audio frame is determined as the start time and stop time of the phoneme W, that is, the time of the first audio frame is determined as the start time of the start time and stop time, and the time of the first audio frame is also determined as the stop time of the start time and stop time.

Figure 3C:
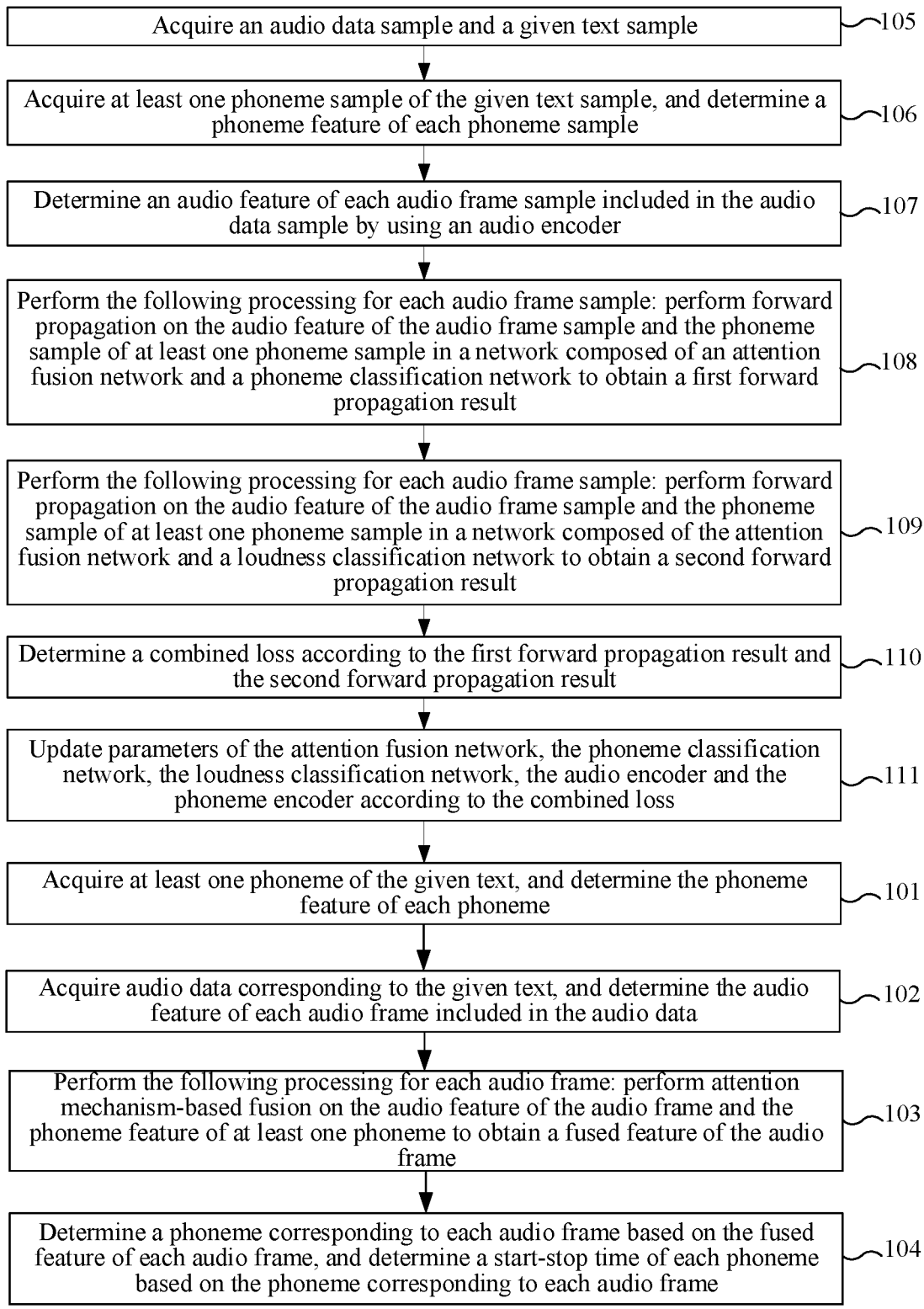

In some embodiments, referring to FIG. 3C, FIG. 3C is a flowchart of an audio processing method based on artificial intelligence according to an embodiment of this application. Prior to performing step 101 in which at least one phoneme of the given text is acquired, and the phoneme feature of each phoneme is determined, or prior to performing step 102 in which the audio data corresponding to the given text is acquired, and the audio feature of each audio frame included in the audio data is determined, step 105 to step 111 shown in FIG. 3C may be performed.

Step 105: Acquire an audio data sample and a given text sample.

As an example, the given text sample corresponds to the audio data sample. For example, the audio data sample is obtained by the user reading the given text.

Step 106: Acquire at least one phoneme sample of the given text sample, and determine the phoneme feature of each phoneme sample by using the phoneme encoder.

Step 107: Determine the audio feature of each audio frame sample included in the audio data sample by using the audio encoder.

As an example, the audio encoder and the phoneme encoder participating in the training may be of a pre-trained network structure. The embodiment of this application adopts a pre-trained acoustic model to perform audio feature extraction, such as a sound steering quantity model. The sound steering quantity model is formed by a multi-layer convolution network. A large number of untagged tasks are used for pre-training the sound steering quantity model based on a contrast loss. When the phoneme alignment model is trained, the audio data (an audio waveform feature) is inputted to the pre-trained network structure.

As an example, referring to FIG. 6, the phoneme alignment model includes a phoneme classification network, a loudness classification network, a sharing attention fusion network, an audio encoder, and a phoneme encoder. Step 103 is implemented by invoking the attention fusion network. The phoneme corresponding to each audio frame is determined by invoking the phoneme classification network. The phoneme classification network and the loudness classification network share the attention fusion network. The input of the attention fusion network is the output of the audio encoder and the output of the phoneme encoder.

Step 108: Perform the following processing for each audio frame sample: forward propagation is performed on the audio feature of the audio frame sample and the phoneme feature of at least one phoneme sample in a network composed of the attention fusion network and the phoneme classification network to obtain a first forward propagation result.

In some embodiments, the forward propagation is performed on the audio feature of the audio frame sample and the phoneme feature of at least one phoneme sample in the network composed of the attention fusion network and the phoneme classification network to obtain the first forward propagation result, which may be implemented by the following technical schemes: the following processing is performed for each phoneme sample by using the attention layer of the attention fusion network: the weight of the corresponding phoneme sample is determined based on the audio feature of the audio frame sample and the phoneme feature of the phoneme sample; value vector transformation is performed on the phoneme feature of the phoneme sample, and the weight of the corresponding phoneme sample is multiplied with the value vector transformation result to obtain the attention result of the corresponding phoneme sample; the attention result corresponding to each phoneme sample and the audio feature of the audio frame sample are fused by the fusion layer of the attention fusion network to obtain the fused feature corresponding to the audio frame sample; first full connection is performed on the fused feature of the audio frame sample by using the phoneme classification network to obtain a third probability that the audio frame sample belongs to each candidate phoneme; and the third probability and the weight are organized into the first forward propagation result.

As an example, in order to better fuse the phoneme features and audio feature representation, it is necessary to constrain a weight matrix in the embodiment of this application, that is, to constrain the attention weight. Each row in the weight matrix represents an audio frame, and each column represents the probability distribution of each phoneme corresponding to the audio frame.

Step 109: Perform the following processing for each audio frame sample: forward propagation is performed on the audio feature of the audio frame sample and the phoneme feature of at least one phoneme sample in the network composed of the attention fusion network and a loudness classification network to obtain a second forward propagation result.

In some embodiments, the forward propagation is performed on the audio feature of the audio frame sample and the phoneme feature of at least one phoneme sample in the network composed of the attention fusion network and the loudness classification network to obtain the second forward propagation result, which may be implemented by the following technical schemes: the audio feature of the audio frame sample is mapped by the attention fusion network to obtain the weight of the phoneme feature of each phoneme sample, and the audio feature of the audio frame sample and the phoneme feature of the at least one phoneme sample are fused based on the weight of the phoneme feature of each phoneme sample to obtain the fused feature of each audio frame sample; second full connection is performed on the fused feature of each audio frame sample by using the loudness classification network to obtain a second probability that each audio frame sample belongs to each loudness category, and the second probability that each audio frame sample belongs to each loudness category is organized into the second forward propagation result.

As an example, during the data forward propagation, the input of the loudness classification network is the same as the input of the phoneme classification network.

In some embodiments, the forward propagation is performed on the audio feature of the audio frame sample and the phoneme feature of at least one phoneme sample in the network composed of the attention fusion network and the loudness classification network to obtain the second forward propagation result, which may be implemented by the following technical schemes: the following processing is performed for each phoneme sample by using the attention layer of the attention fusion network: the weight of the corresponding phoneme sample is determined based on the audio feature of the audio frame sample and the phoneme feature of the phoneme sample; value vector transformation is performed on the phoneme feature of the phoneme sample, and the weight of the corresponding phoneme sample is multiplied with the value vector transformation result to obtain the attention result of the corresponding phoneme sample; the attention result corresponding to each phoneme sample and the audio feature of the audio frame sample are fused by the fusion layer of the attention fusion network to obtain the fused feature corresponding to the audio frame sample; second full connection is performed on the fused feature of the audio frame sample by the loudness classification network to obtain the second probability that the audio frame sample belongs to each candidate phoneme; and the second probability and the weight are organized into the second forward propagation result.

As an example, the phoneme alignment model includes the attention fusion network, the phoneme classification network, and the loudness classification network. The input of the audio encoder is the audio data sample. The output of the audio encoder is the audio feature (in a vector form) of each audio frame sample included in the audio data. The input of the phoneme encoder is a phoneme sequence sample (the given text). The output of the phoneme encoder is the phoneme feature (the data form of the phoneme feature is a vector) of each phoneme sample. The input of the attention fusion network is the output of the audio encoder and the output of the phoneme encoder. The output of the attention fusion network is the fused feature of the phoneme feature and the audio feature. Attention mechanism calculation is performed on the audio feature of each audio frame and all phonemes to obtain the fused feature. The representation of the candidate phoneme corresponding to the audio frame and the representation whether the audio frame corresponds to the mute are determined. The fused features are classified by the parallel phoneme classification network and loudness classification network. The phoneme classification network outputs the third probability that each audio frame belongs to each candidate phoneme. The loudness classification network outputs the second probability that each audio frame belongs to each loudness category. The loudness categories include mute and non-mute. For example, the non-mute identifier is 1, and the mute identifier is 0. The loudness categories may also be divided by finer granularity, such as mute, 10 db, 20 db, 30 db, and the like, and the candidate phonemes are W, IH, L, and the like.

Step 110: Determine a combined loss according to the first forward propagation result and the second forward propagation result.

In some embodiments, the combined loss is determined according to the first forward propagation result and the second forward propagation result, which may be implemented by the following technical schemes: a first phoneme category loss is determined based on the third probability that each audio frame corresponds to a plurality of candidate phonemes, and a pre-marked candidate phoneme of each audio frame sample; a second loudness category loss is determined based on the second probability that each audio frame sample corresponds to a plurality of loudness categories, and a pre-marked loudness category of each audio frame sample; a third alignment loss is determined based on the weight of each phoneme sample corresponding to each audio frame sample, and a pre-marked alignment identifier of each phoneme sample corresponding to each audio frame sample; and the first phoneme category loss, the second loudness category loss, and the third alignment loss are fused to obtain the combined loss. The combined loss is composed of multi-dimensional losses, and the training is performed based on the combined loss, so that the training effect of the phoneme alignment model can be improved effectively.

As an example, a cross loss is used for calculating the losses of two categories in a training process of the phoneme alignment model, referring to formula (4) and formula (5):

$$L_{phone} = -\sum_{i=1}^{m}\sum_{j=1}^{c} y_{phone\,i}^{j} \times \log(p_{phone\,i}^{j}); \qquad (4)$$

$$L_{sil} = -\sum_{i=1}^{m} y_{sil}^{i} \times \log(p_{sil}^{i}) + (1 - y_{sil}^{i}) \times \log(1 - p_{sil}^{i}); \qquad (5)$$

where $L_{phone}$ is the phoneme classification loss (the first phoneme category loss), $L_{sil}$ is the loudness classification loss (the second loudness category loss), m is the number of audio frames, c is the number of candidate phonemes, $y_{phone\,i}^{j}$ is a real identifier result of a $j^{th}$ phoneme corresponding to the $i^{th}$ audio frame, $p_{phone\,i}^{j}$ is the first probability that the $i^{th}$ audio frame corresponds to the $j^{th}$ phoneme, $y_{sil}^{i}$ is the pre-marked alignment identifier of the $i^{th}$ audio frame, the non-mute is 1, the mute is 0, and $p_{sil}^{i}$ is the probability that the $i^{th}$ audio frame is the non-mute audio frame.

In some embodiments, in order to better fuse the phoneme feature and audio feature representations, the weight matrix in the embodiment of this application is constrained, that is, the attention weight is constrained. Each row in the matrix represents an audio frame, and each column represents the probability distribution of each phoneme in the audio frame. Loss calculation is performed on the probability distribution of the phoneme of each audio frame and the phoneme actually corresponding to the audio frame to obtain the attention mechanism loss, referring to formula (6):

$$L_{align} = -\sum_{i=1}^{m}\sum_{j=1}^{N_p} y_{align\,i}^{j} \times \log(p_{attention\,i}^{j}); \qquad (6)$$

where $L_{align}$ is the attention mechanism loss, m is the number of the audio frames, $N_p$ is the number of the phonemes in the given text, $y_{align}^{j}$ is 1 or 0, 1 represents that the $i^{th}$ audio frame is aligned with the $j^{th}$ phoneme, 0 represents that the $i^{th}$ audio frame is not aligned with the $j^{th}$ phoneme, and $p_{attention\,i}^{j}$ is the weight of the $i^{th}$ audio frame and the $j^{th}$ phoneme.

In some embodiments, the combined loss of the whole phoneme alignment network is composed of three parts, including the phoneme classification loss (the first phoneme category loss), the loudness classification loss (the second loudness category loss), and the alignment loss (the third alignment loss). Different weights are adopted to perform weighted summation on the three losses, and the final combined loss is shown in formula (7):

$$L_{total} = \lambda L_{phone} + \beta L_{sil} + \gamma L_{align} \qquad (7);$$

where the weights ($\lambda$, $\beta$, and $\gamma$) of each loss are preset weights, the sum of the three weights is equal to 1, $L_{phone}$ is the phoneme classification loss (the first phoneme category loss), $L_{sil}$ is the loudness classification loss (the second loudness category loss), $L_{align}$ is the alignment loss (the third alignment loss), and $L_{total}$ total is the combined loss.

Step 111: Update parameters of the attention fusion network, the phoneme classification network, the loudness classification network, the phoneme encoder, and the audio encoder according to the combined loss.

As an example, when the parameters of the attention fusion network, the phoneme classification network, the loudness classification network, the phoneme encoder, and the audio encoder are updated according to the combined loss, a gradient is determined according to the combined loss, and then the parameters of each network are updated by a descent algorithm, so that the combined loss is converged to a minimal value as far as possible.

According to the embodiment of this application, attention mechanism calculation is performed on the audio feature and the text sequence to obtain the fused feature, so that the fused feature can effectively represent the relationship between the audio frame and the phoneme. Then phoneme classification is performed on each audio frame in the audio based on the fused feature, so that the classification accuracy may be improved effectively, thereby improving the alignment accuracy of the phonemes.

An exemplary application of the embodiment of this application in an actual application scenario is described below.

In some embodiments, when the audio processing system is applied to an oral test scenario, for example, oral test questions require an examinee user to read the given text in English. An examinee terminal receives the audio data of the user corresponding to the given text. The examinee terminal transmits the audio data to the server. The server maps the audio feature of the audio frame to obtain the weight of the phoneme feature of each phoneme, fuses the audio feature of the audio frame and the phoneme feature of at least one phoneme based on the weight of the phoneme feature of each phoneme to obtain the fused feature of each audio frame, determines the phoneme corresponding to each audio frame based on the fused feature of each audio frame, determines the start time and stop time of each phoneme based on the phoneme corresponding to each audio frame, and transmits the start time and stop time to a judge terminal, so that the judge terminal directly presents the start time and stop time of each phoneme. In response to a scoring operation of a judge user, the judge terminal may display the scoring result for each phoneme. That is, an embodiment of this application mainly provides an automatic phoneme labeling tool to label a corresponding location of each phoneme of the given text in the audio data, which may further label whether the phoneme and the word are read incorrectly on this basis, so that the manual labeling cost is effectively reduced, and a more convenient scoring environment is provided for subsequent scoring by the judges.

In some embodiments, when the audio processing system is applied to an oral practice scenario, for example, oral practice questions require a student user to read the given text in English. A student terminal receives the audio data of the user corresponding to the given text. The student terminal transmits the audio data to the server. The server maps the audio feature of the audio frame to obtain the weight of the phoneme feature of each phoneme, fuses the audio feature of the audio frame and the phoneme feature of at least one phoneme based on the weight of the phoneme feature of each phoneme to obtain the fused feature of each audio frame, determines the phoneme corresponding to each audio frame based on the fused feature of each audio frame, determines the start time and stop time of each phoneme based on the phoneme corresponding to each audio frame, and transmits the start time and stop time to an examinee terminal, so that the examinee terminal directly presents the start time and stop time of each phoneme. In response to a scoring operation of the examinee user, the examinee terminal may display the scoring result for each phoneme. The scoring result may be a label whether the pronunciation of the phoneme is correct. That is, the embodiment of this application mainly provides an automatic phoneme labeling tool to label the corresponding location of each phoneme of the given text in the audio data, which may further label whether the phoneme and the word are read incorrectly on this basis, so that the manual labeling cost is effectively reduced, and a more convenient self-examining environment is provided for the subsequent scoring by the examinees.

The phoneme forced alignment refers to aligning the given phoneme sequence text with the corresponding audio to obtain a time location of each phoneme in the text in the audio. The phoneme alignment has different applications in speech processing, such as speech recognition, speech key word detection, and the like. According to the embodiment of this application, attention mechanism calculation is performed on the audio feature and the text sequence to obtain the fused audio and text feature. Phone classification is performed on each frame in the audio. In order to achieve more accurate alignment, an auxiliary task is added, such as determining whether each frame in the audio is mute. At the same time, the obtained weight matrix is constrained to achieve more accurate alignment.

Figure 4A:
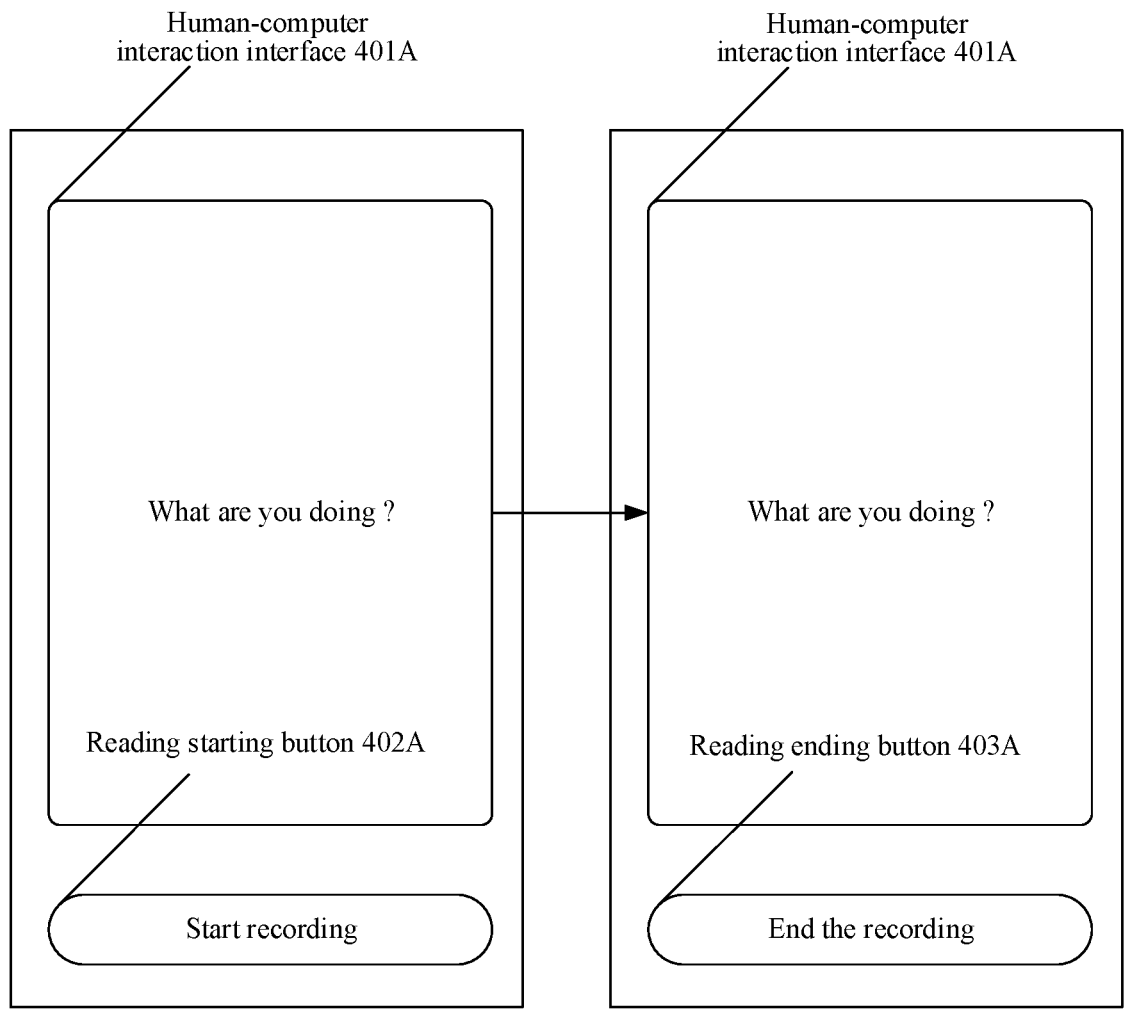
FIG. 4A to FIG. 4D are interface schematic diagrams of an audio processing method based on artificial intelligence according to an embodiment of this application.

In some embodiments, referring to FIG. 4A, FIG. 4A is an interface schematic diagram of an audio processing method based on artificial intelligence according to an embodiment of this application. A human-computer interaction interface 401A displays a reading button 402A and a reading ending button 403A. The human-computer interaction interface 401A also displays the given text "What are you doing?". In response to a trigger operation of the examinee user for the reading button 402A, the examinee terminal receives the audio data corresponding to the given text. In response to the trigger operation of the examinee user for the reading ending button 403A, the examinee terminal stops receiving the audio data corresponding to the given text.

Figure 4B:
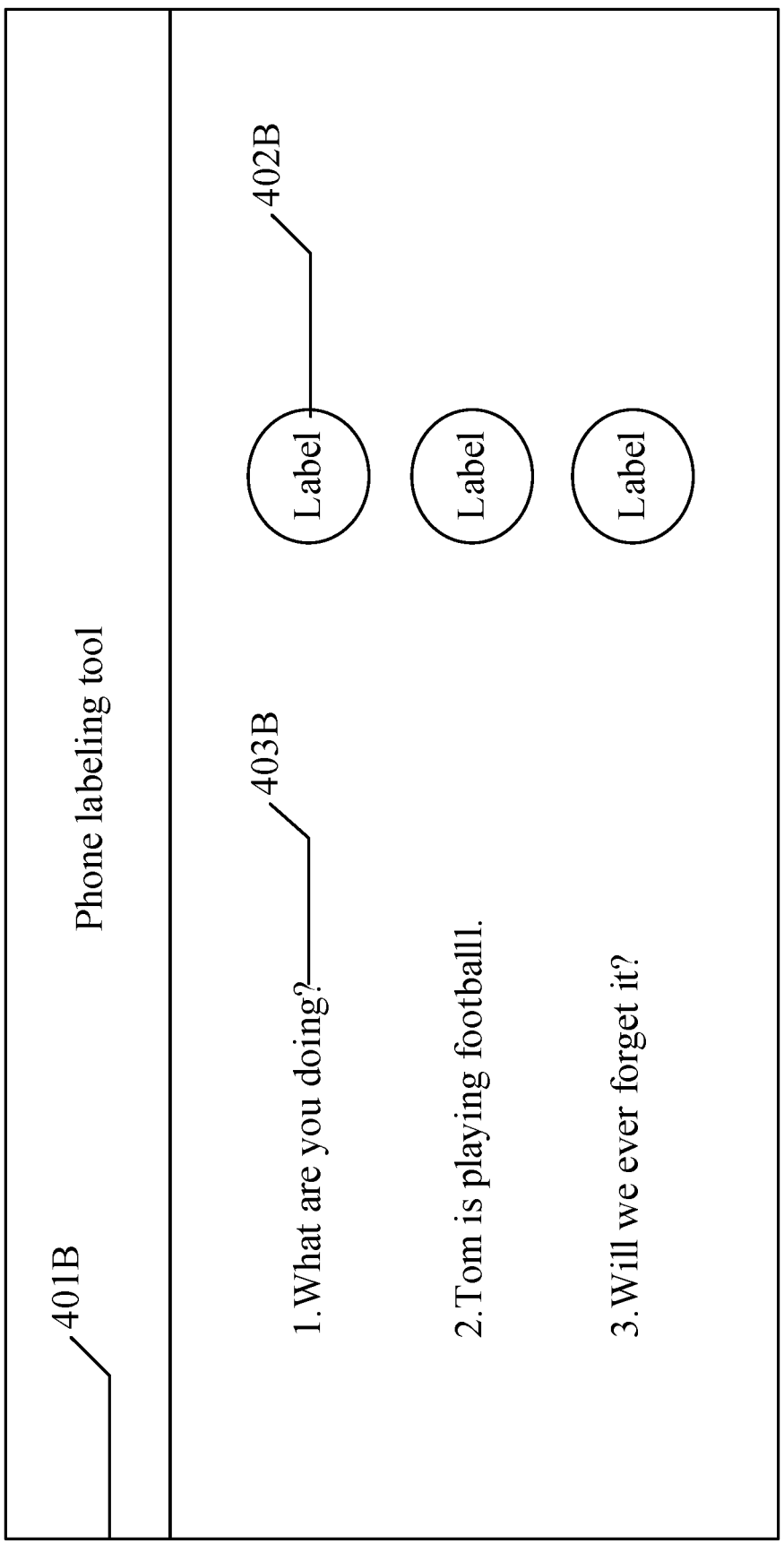

In some embodiments, referring to FIG. 4B, FIG. 4B is an interface schematic diagram of an audio processing method based on artificial intelligence according to an embodiment of this application. A phoneme labeling function may be embedded in a web page, and may also be embedded in a client. A phoneme-level labeling process for pronunciation by the user is as follows: the human-computer interaction interface 401B displays a given text 403B and a labeling button 402B. In response to a trigger operation for the labeling button 402B, the human-computer interaction interface 401B displays a labeling page for the given text 403B.

Figure 4C:
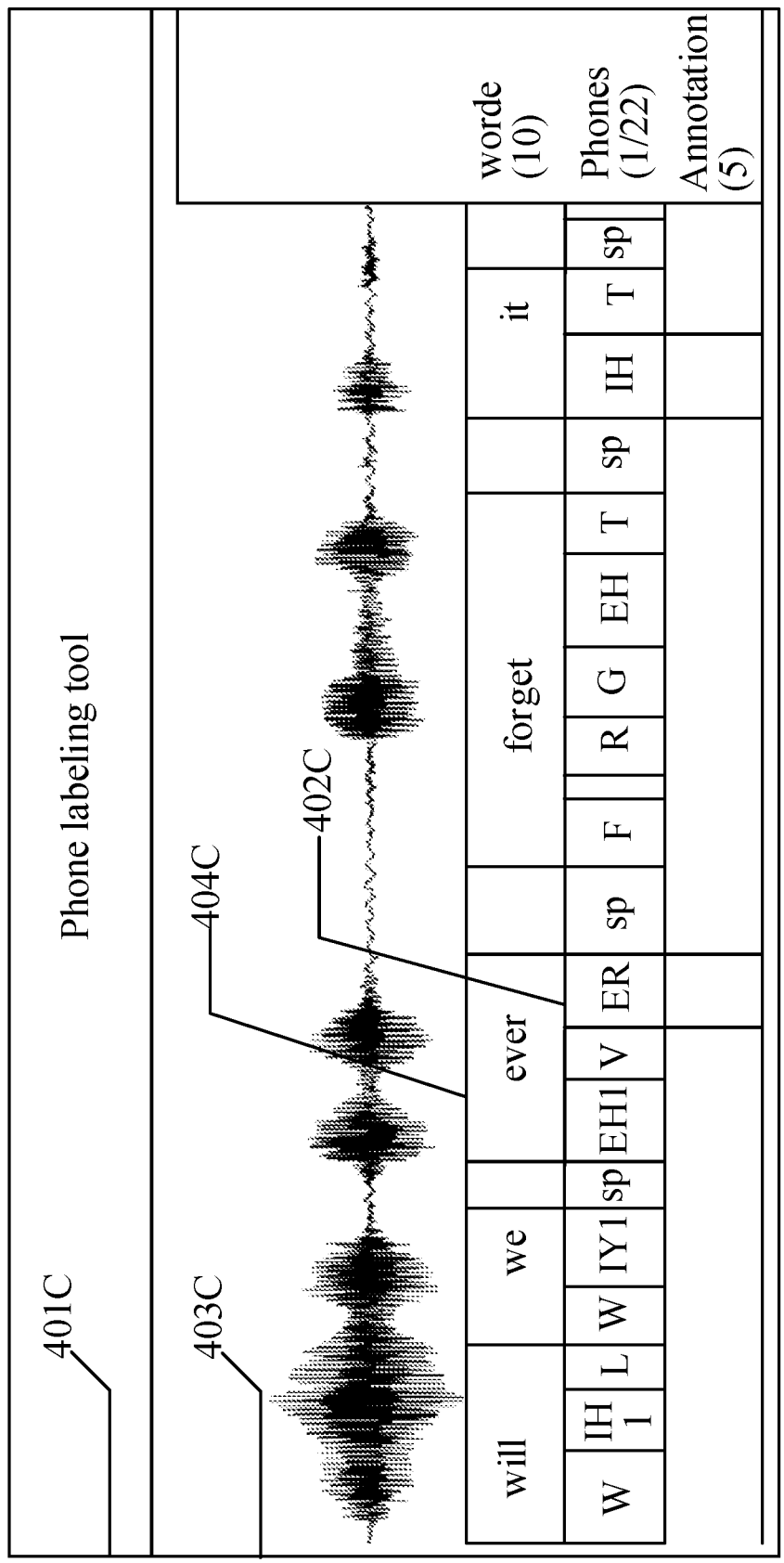

In some embodiments, referring to FIG. 4C, FIG. 4C is an interface schematic diagram of an audio processing method based on artificial intelligence according to an embodiment of this application. A human-computer interaction interface 401C displays a labeling page 403C. The start-stop time of a phoneme 402C in the audio and the start time and stop time of a word 404C in the audio are displayed in the labeling page 403C. The start-stop time of the word 404C in the audio is determined by the start time and stop time of the phoneme 402C in the audio.

Figure 4D:
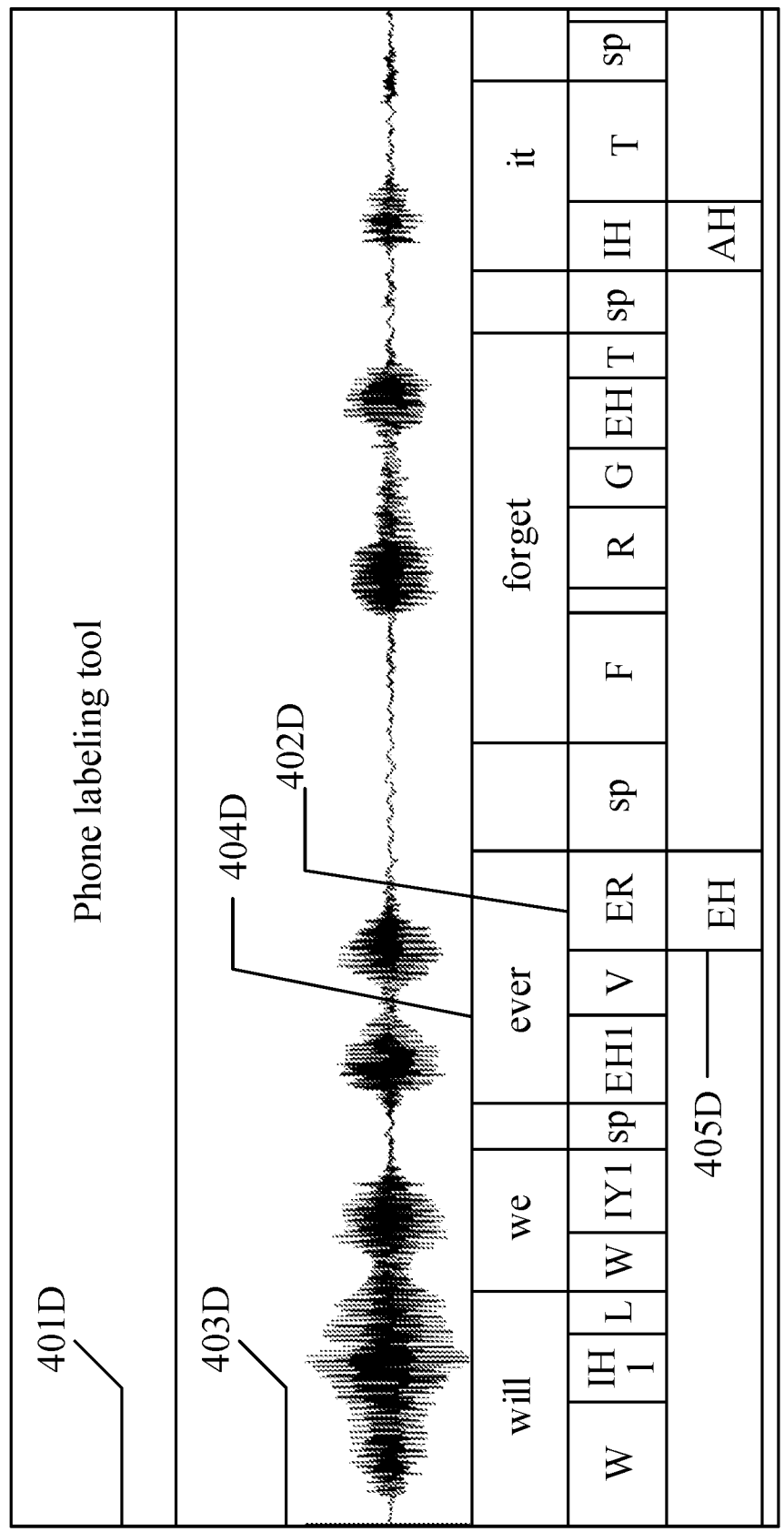

In some embodiments, referring to FIG. 4D, FIG. 4D is an interface schematic diagram of an audio processing method based on artificial intelligence according to an embodiment of this application. A human-computer interaction interface 401D displays a labeling page 403D. The start-stop time of a phoneme 402D in the audio and the start time and stop time of a word 404D in the audio are displayed in the labeling page 403D. The start-stop time of the word 404D in the audio is determined by the start time and stop time of the phoneme 402D in the audio. Therefore, the phonemes that are classified are displayed in the human-computer interaction interface 401D. In response to a labeling operation of the user for the phoneme, a pronunciation label 405D for the phoneme is displayed in a last layer of the labeling page, for example, whether a certain phoneme is incorrect.

Figure 5:
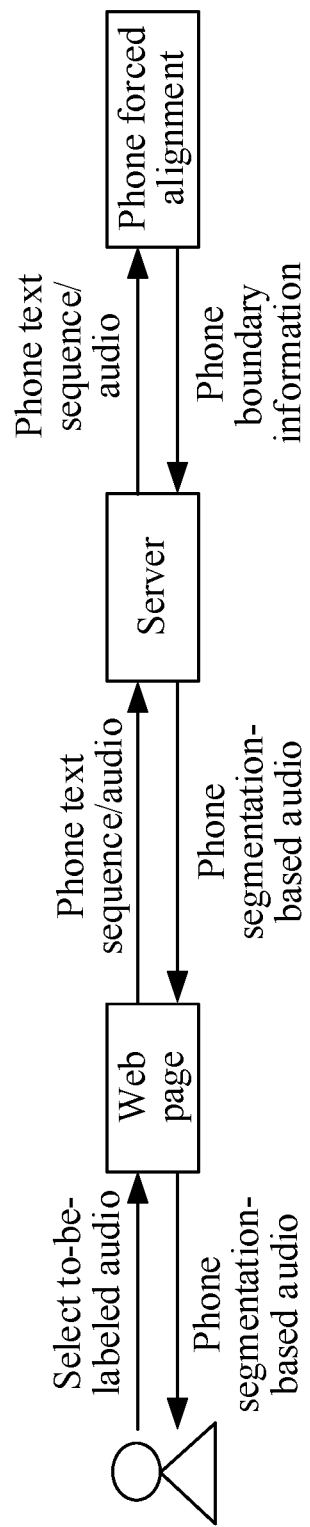
FIG. 5 is a flowchart of an audio processing method based on artificial intelligence according to an embodiment of this application.

In some embodiments, FIG. 5 is a flowchart of an audio processing method based on artificial intelligence according to an embodiment of this application. An overall service process based on the phoneme forced alignment is shown in FIG. 5, including the following steps: after the web page of the phoneme labeling tool is opened, the user may select the to-be-labeled audio and a corresponding to-be-read text; in response to a selection operation of the user, the audio to be labeled and the corresponding phoneme text sequence (originating from the to-be-read text of a topic) are determined, and the labeling is began; the web page transmits the audio data phoneme text sequence (originating from the to-be-read text of a topic) to the server; the server transmits the audio data and the phoneme text sequence (originating from the to-be-read text of a topic) to a phoneme forced alignment module; the phoneme forced alignment module returns the start time and stop time (phoneme boundary information) of each phoneme in the audio data to the server; the server returns the audio segmented based on the phoneme boundary information to the user; and in response to an annotation operation of the user, pronunciation labeling is performed on a phoneme level based on each segmented phoneme pronunciation segment.

In some embodiments, referring to FIG. 6, the phoneme alignment model provided by the embodiments of this application includes the phoneme encoder, the audio encoder, the attention fusion network, the phoneme classification network, and the loudness classification network. The phoneme encoder is configured to extract the phoneme features, and the audio encoder is configured to extract the audio features. The audio feature of the audio frame is mapped to obtain the weight of the phoneme feature of each phoneme. Based on the weight of the phoneme feature of each phoneme, the audio feature of the audio frame and the phoneme feature of at least one phoneme are fused to obtain the fused feature of the audio frame. The fused feature contains the information of the audio feature and the information of the phoneme feature. The phoneme classification network (the full connection layer) and the loudness classification network (the full connection layer) are externally connected behind the attention fusion network. Phone classification is performed on each audio frame by using the phoneme classification network. The phoneme classification contains 40 phonemes in total (including 39 phonemes in the phoneme dictionary and a mute phoneme). Whether each audio frame is the mute audio frame is classified by the loudness classification network (including mute or non-mute).

In some embodiments, based on the audio encoder, the audio feature representation is acquired. The embodiment of this application adopts the pre-trained acoustic model to extract the audio feature, such as the sound steering quantity model. The sound steering quantity model is composed of a multilayer convolution network. A large number of untagged tasks are used for pre-training the sound steering quantity model based on the contrast loss. When the phoneme alignment model is trained, the audio data (audio waveform feature) is inputted to the pre-trained network structure, and the audio feature of each audio frame in the audio data is outputted. The phoneme feature is acquired by the phoneme encoder. The embodiment of this application adopts a phoneme coding method to extract the phoneme feature. The characteristics of each phoneme are represented by the unique vectors (characteristic representation features). The characteristic vectors (the characteristic representation features) of each phoneme are initialized by a random initialization method. At the same time, in order to differ the representation of the phoneme on different locations in the word, the location vector (the location representation feature) of each phoneme is initialized randomly, including four locations representing a beginning location (B), an intermediate location (I), and an end location (E) of the word when the word contains a plurality of phonemes. When the word contains one phoneme, the location is represented by S. These locations are coded to obtain the location vectors of each phoneme. Finally, the unique code representation (a pronunciation vector) of each phoneme is added with the location code representation (the location vector) to obtain the final phoneme feature. After the phoneme of the given text is inputted to the phoneme encoder, the depth feature representation (the phoneme feature) of each phoneme is obtained.

In some embodiments, the phoneme feature and the audio feature are fused based on the attention mechanism. The embodiment of this application adopts the attention mechanism to fuse the phoneme feature and the audio feature, and the attention mechanism is used for modeling a relationship between the query vector Q, the key vector K and the value vector V, referring to formula (8) and formula (9):

$$AttentionScore(Q, K) = \mathrm{softmax}\left(\frac{QK^T}{\sqrt{d_k}}\right); \quad (8)$$

$$Attention(Q, K, V) = AttentionScore(Q, K) * V; \quad (9)$$

where the audio feature $h_{speech}^i$ of each audio frame is used as the query vector Q, the phoneme feature $H_{phone}$ of all phonemes of the given text is used as the key vector K and the value vector V, AttentionScore(Q,K) is the weight, Attention(Q,K,V) is the attention result of all phonemes corresponding to each audio frame, and $d_k$ is the dimension of the key vector K.

In some embodiments, the matrix obtained based on the attention mechanism is spliced with the audio feature to finally obtain the fused feature, referring to formula (10):

$$h_{fusion}^i [Attention(h_{speech}^i, H_{phone}), h_{speech}^i] \quad (10);$$

where $Attention(h_{speech}^i, H_{phone})$ is the attention result of the audio frame i obtained based on the attention mechanism, the attention result of the audio frame i is the matrix, each column in the matrix represents the attention result of each of all phonemes and the audio frame i, $h_{speech}^i$ is the audio feature of the audio frame i, $H_{phone}$ is the phoneme feature of all phonemes of the given text, and $h_{fusion}^i$ is the fused feature corresponding to each audio frame.

In some embodiments, a cross loss is used for calculating the losses of two categories in the training process of the phoneme alignment model, referring to formula (11) and formula (12):

$$L_{phone} = -\sum_{i=1}^{m}\sum_{j=1}^{c} y_{phone\,i}^j \times \log(p_{phone\,i}^j); \quad (11)$$

$$L_{sil} = -\sum_{i=1}^{m} y_{sil}^i \times \log(p_{sil}^i) + (1 - y_{sil}^i) \times \log(1 - p_{sil}^i); \quad (12)$$

where $L_{phone}$ is the phoneme classification loss (the first phoneme category loss), $L_{sil}$ is the loudness classification loss (the second loudness category loss), m is the number of audio frames, c is the number of candidate phonemes, $y_{phone\,i}^j$ is a real identifier result of a $j^{th}$ phoneme corresponding to the $i^{th}$ audio frame, $p_{phone\,i}^j$ is the first probability that the $i^{th}$ audio frame corresponds to the $j^{th}$ phoneme, $y_{sil}^i$ is the pre-marked alignment identifier of the $i^{th}$ audio frame, the non-mute is 1, the mute is 0, and $p_{sil}^i$ is the probability that the $i^{th}$ audio frame is the non-mute audio frame.

In some embodiments, in order to better fuse the phoneme feature and audio feature representations, the weight matrix in the embodiment of this application is constrained, that is, the attention weight is constrained. Each row in the matrix represents an audio frame, and each column represents the probability distribution of each phoneme in the audio frame. Loss calculation is performed on the probability distribution of the phoneme of each audio frame and the phoneme actually corresponding to the audio frame to obtain the attention mechanism loss, referring to formula (13):

$$L_{align} = -\sum_{i=1}^{m}\sum_{j=1}^{N_p} y_{align\,i}^j \times \log(p_{attention\,i}^j); \quad (13)$$

where $L_{align}$ is the attention mechanism loss, m is the number of the audio frames, $N_p$ is the number of the phonemes in the given text, $y_{align\,i}^j$ is 1 or 0, 1 represents that the $i^{th}$ audio frame is aligned with the $j^{th}$ phoneme, 0 represents that the $i^{th}$ audio frame is not aligned with the $j^{th}$ phoneme, and $p_{attention\,i}^j$ is the weight of the $i^{th}$ audio frame and the $j^{th}$ phoneme.

In some embodiments, the combined loss of the whole phoneme alignment network is composed of three parts, including the phoneme classification loss (the first phoneme category loss), the loudness classification loss (the second loudness category loss), and the alignment loss (the third alignment loss). Different weights are adopted to perform weighted summation on the three losses, and the final combined loss is shown in formula (14):

$$L_{total} = \lambda L_{phone} + \beta L_{sil} + \gamma L_{align} \quad (14);$$

where the weights ($\lambda$, $\beta$, and $\gamma$) of each loss are preset weights, the sum of the three weights is equal to 1, $L_{phone}$ is the phoneme classification loss (the first phoneme category loss), $L_{sil}$ is the loudness classification loss (the second loudness category loss), $L_{align}$ is the alignment loss (the third alignment loss), and $L_{total}$ is the combined loss.

In some embodiments, referring to FIG. 7, FIG. 7 is a data flowchart of an audio processing method based on artificial intelligence according to an embodiment of this application. The phoneme alignment model includes the attention fusion network, the phoneme classification network (corresponding to the first task), and the loudness classification network (corresponding to the second task). The input of the audio encoder is audio data. The output of the audio encoder is the audio feature (the vector form) of each audio frame included in the audio data. The input of the phoneme encoder is the phoneme sequence (the given text). The output of the phoneme encoder is the phoneme feature (the data form of the phoneme feature is a vector) of each phoneme. The input of the attention fusion network is the output of the audio encoder and the output of the phoneme encoder. The output of the attention fusion network is the fused feature of the phoneme feature and audio feature. Attention mechanism calculation is performed on the audio feature of each audio frame and all phonemes to obtain the fused feature. The representation of the candidate phoneme corresponding to the audio frame and the representation whether the audio frame corresponds to the mute phoneme are determined. The fused features are classified by the parallel phoneme classification network and loudness classification network. The phoneme classification network outputs the probability that each audio frame belongs to each candidate phoneme. The loudness classification network outputs the probability that each audio frame belongs to each loudness category. The loudness categories include mute and non-mute. For example, the non-mute identifier is 1, and the mute identifier is 0. The candidate phonemes are W, IH, L, and the like.

In some embodiments, the embodiment of this application adopts two disclosed datasets for experiments, including a TIMIT dataset and a Buckeye dataset. The two datasets may be used for performing time marking on each phoneme in the audio, and finally index calculation is performed. Indexes include at least one of the following: an accuracy rate P between the phoneme boundary predicted by the phoneme alignment model and the actual phoneme boundary, a recall rate R, and F1 grade. In addition, in order to solve the problems of high recall rate, low accuracy rate, and high value of F1 grade, R-value is introduced for evaluation, referring to formula (15) to formula (17):

$$R - \text{value} = 1 - \frac{|r_1| + |r_2|}{2}; \quad (15)$$

$$r_1 = \sqrt{(1 - R)^2 + (OS)^2}; \quad (16)$$

$$r_2 = \frac{(-OS + R - 1)}{\sqrt{2}}; \quad (17)$$

where P is the accuracy rate, R is the recall rate, and OS is RIP−1.

For a final result, refer to table 1. Discrimi, Montreal, and SEGFEAT all are models in related technologies. It may be seen from table 1 that according to the embodiment of this application, in different disclosed datasets, the accuracy of the phoneme boundary is greatly improved.

TABLE 1

Score of each model in each dataset in the embodiment of this application and the related technologies

| Corpora | Model | P | R | F1 | R-value |
|---|---|---|---|---|---|
| TIMIT | Ours | 93.42 | 95.96 | 94.67 | 95.18 |
| TIMIT | Discrimi | 90 | 82.2 | 85.9 | 79.51 |
| TIMIT | Montreal | 83.9 | 81.6 | 82.7 | 85.16 |
| TIMIT | SEGFEAT | 92.67 | 93.03 | 92.85 | 93.91 |
| Buckeye | Ours | 88.49 | 90.33 | 89.40 | 90.90 |
| Buckeye | SEGFEAT | 85.40 | 89.12 | 87.23 | 88.76 |

Figure 8A:
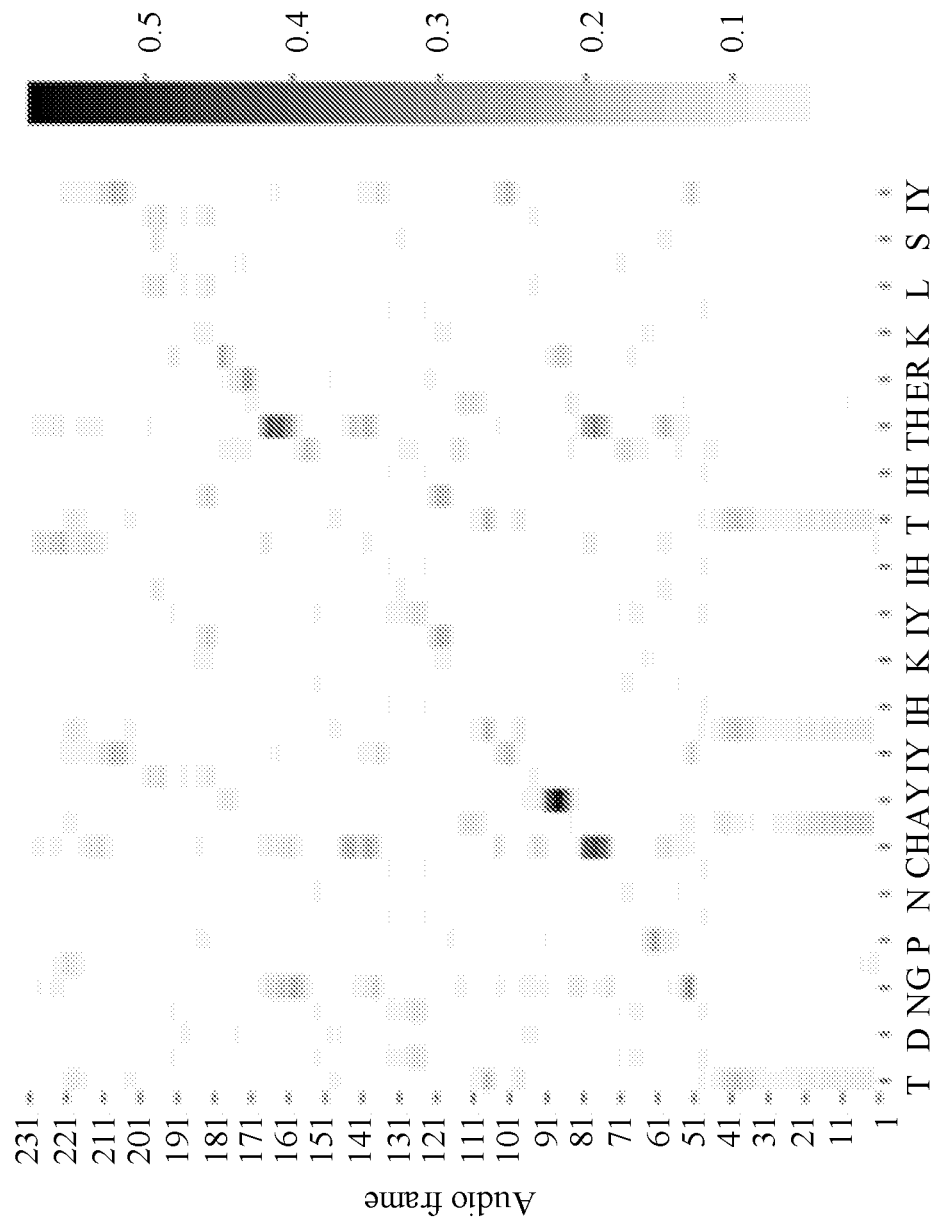
FIG. 8A to FIG. 8C are alignment time matrices of an audio processing method based on artificial intelligence according to an embodiment of this application.
Figure 8B:
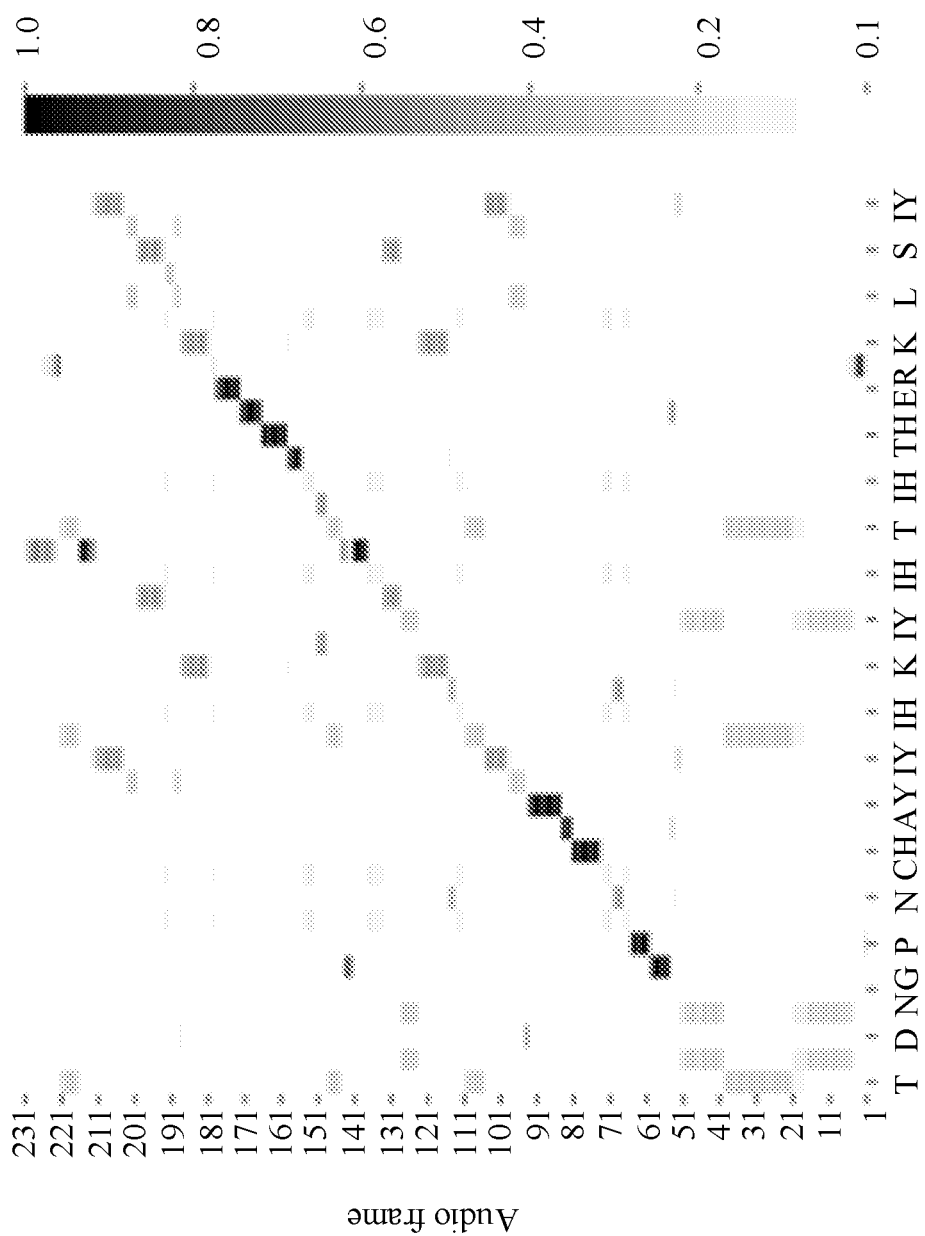
Figure 8C:
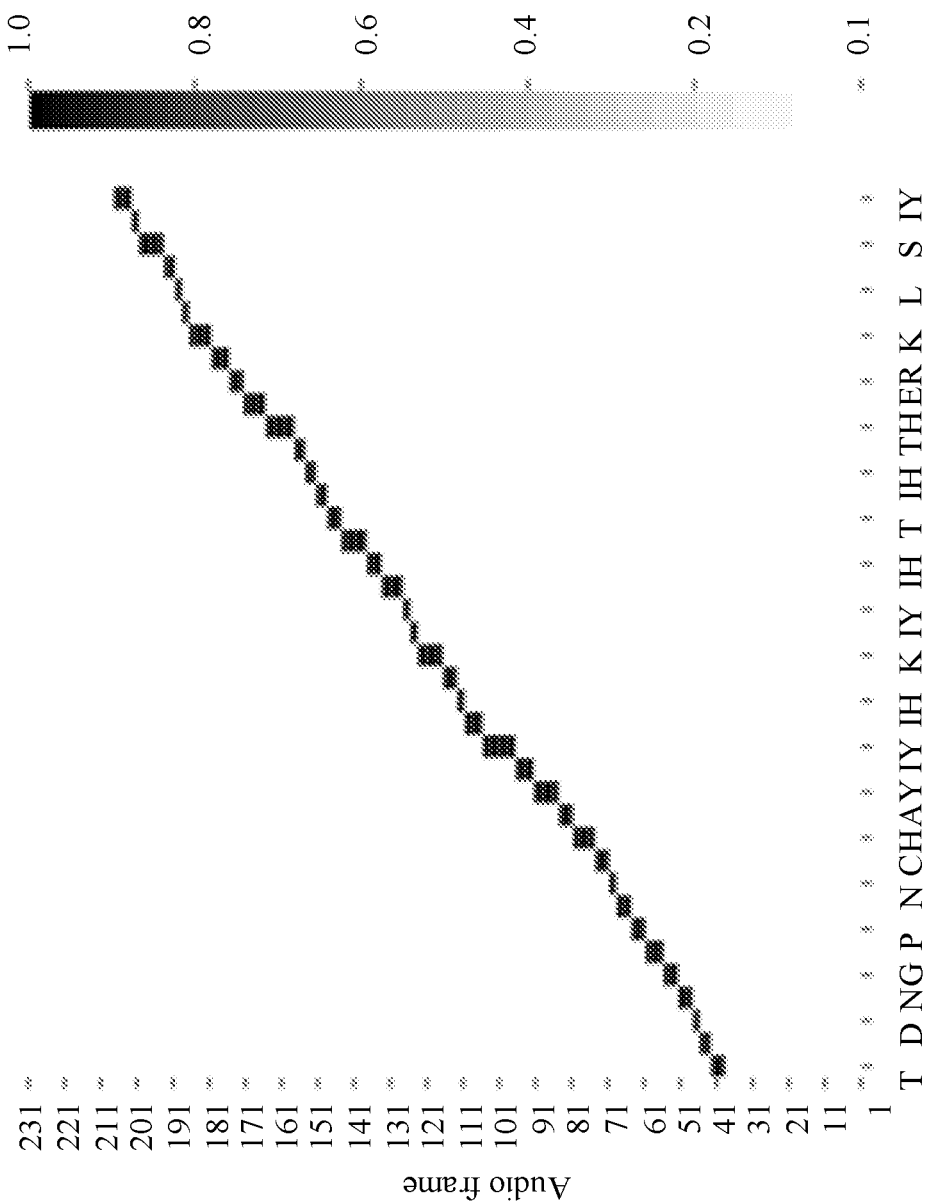

Referring to FIG. 8A to FIG. 8C, FIG. 8A to FIG. 8C are alignment time matrices of an audio processing method based on artificial intelligence according to an embodiment of this application. In order to verify the effectiveness for constraining the attention mechanism, a phoneme alignment matrix is drawn. A vertical axis is audio frames divided by time, and a horizontal axis is each phoneme. FIG. 8A shows the alignment time matrix without attention weight constraint. FIG. 8B shows the alignment time matrix with constraint. FIG. 8C shows the real alignment time matrix. It may be seen that the matrix with the attention mechanism constraint is integrally more in line with the actual alignment time of the phoneme and audio.

It may be understood that during the application of the embodiments of this application in specific products or technologies, relevant data involving in user information in the embodiments of this application need the permission or consent of the user, and the collection, use and processing of relevant data need to comply with relevant laws, regulations and standards of relevant countries and regions.

An exemplary structure in which an audio processing apparatus 255 based on artificial intelligence according to an embodiment of this application is implemented as a software module is described below. In some embodiments, as shown in FIG. 2, software modules stored in the audio processing apparatus 255 based on artificial intelligence of a memory 250 may include: a phoneme module 2551, configured to acquire at least one phoneme of a given text, and determine a phoneme feature of each phoneme; an audio module 2552, configured to acquire audio data corresponding to the given text, and determine an audio feature of each audio frame included in the audio data; a fusion module 2553, configured to perform the following processing for each audio frame: map the audio feature of the audio frame to obtain a weight of a phoneme feature of each phoneme, and fuse the audio feature of the audio frame and the phoneme feature of the at least one phoneme based on the weight of the phoneme feature of each phoneme to obtain a fused feature of each audio frame; and an alignment module 2554, configured to determine a phoneme corresponding to each audio frame based on the fused feature of each audio frame, and determine a start time and a stop time of each phoneme based on the phoneme corresponding to each audio frame.

In some embodiments, the audio module 2552 is further configured to: perform feature extraction on at least one audio frame to obtain a convolution feature extraction result corresponding to each audio frame; and normalize the convolution feature extraction result of each audio frame to obtain the audio feature of each audio frame.

In some embodiments, the phoneme module 2551 is further configured to: perform the following processing for each phoneme: determine a characteristic representation feature of the phoneme, the characteristic representation feature representing characteristics of the phoneme; determine a location representation feature of the phoneme, the location representation feature representing a location of the phoneme in a corresponding text unit; and add the location representation feature with the characteristic representation feature to obtain the phoneme feature of the phoneme.

In some embodiments, the fusion module 2553 is further configured to: perform the following processing for each phoneme: perform value vector transformation on the phoneme feature of the phoneme to obtain a value vector; multiply the weight corresponding to the phoneme with the value vector to obtain an attention result corresponding to the phoneme; and fuse the attention result corresponding to the at least one phoneme and the audio feature of the audio frame to obtain the fused feature corresponding to the audio frame.

In some embodiments, the fusion module 2553 is further configured to: perform query vector transformation on the audio feature to obtain a query vector; perform key vector transformation on the phoneme feature to obtain a key vector; multiply the query vector with transpose of the key vector to obtain a multiplication result; acquire a square root of the dimension of the key vector determine a ratio of the multiplication result to the square root as an attention feature; and perform maximum likelihood processing on the attention feature to obtain the weight of the corresponding phoneme.

In some embodiments, determining the phoneme corresponding to each audio frame is implemented by invoking the phoneme classification network. The phoneme classification network includes at least one cascaded phoneme full connection layer. The alignment module 2554 is further configured to: perform the following processing for each audio frame: perform first full connection on the fused feature by using a phoneme full connection layer when the number of the phoneme full connection layer is one to obtain a first probability that the audio frame belongs to each candidate phoneme; perform first full connection on an input of an $n^{th}$ phoneme full connection layer by using the $n^{th}$ phoneme full connection layer in N cascaded phoneme full connection layers when the number of the phoneme full connection layers is multiple, and transmit an $n^{th}$ phoneme full connection result outputted by the $n^{th}$ phoneme full connection layer to a $(n+1)^{th}$ phoneme full connection layer so as to continue the first full connection to obtain a $(n+1)^{th}$ phoneme full connection result corresponding to the $(n+1)^{th}$ phoneme full connection layer; and N is an integer greater than or equal to 2, n is an integer variable that increases gradually from 1, a value range of n is that $1 \le n<N$, when the value of n is 1, the input of the $n^{th}$ phoneme full connection layer is the fused feature, when the value of n is $2 \le n<N$, the input of the $n^{th}$ phoneme full connection layer is the $(n-1)^{th}$ phoneme full connection result outputted by a $(n-1)^{th}$ phoneme full connection layer, and when the value of n is N−1, the $(n+1)^{th}$ phoneme full connection result is the first probability that the audio frame belongs to each candidate phoneme; and determine the candidate phoneme with the maximum first probability as the phoneme corresponding to the audio frame.

In some embodiments, the alignment module 2554 is further configured to: determine at least one audio frame corresponding to each phoneme based on the phoneme corresponding to each audio frame; perform the following processing for each phoneme: determine the start time and stop time of consecutive audio frames corresponding to the phoneme as the start time and stop time of the phoneme when the phoneme corresponds to a plurality of consecutive audio frames; and determine the time of the audio frame corresponding to the phoneme as the start time and stop time of the phoneme when the phoneme corresponds to one audio frame.

In some embodiments, mapping the audio feature of the audio frame to obtain the weight of the phoneme feature of each phoneme, and fusing the audio feature of the audio frame and the phoneme feature of the at least one phoneme based on the weight of the phoneme feature of each phoneme to obtain the fused feature of each audio frame are implemented by invoking the attention fusion network, and determining the phoneme corresponding to each audio frame is implemented by invoking the phoneme classification network. The phoneme classification network and the loudness classification network share the attention fusion network. The apparatus further includes: a training module 2555, configured to: acquire an audio data sample and a given text sample; acquire at least one phoneme sample of the given text sample, and determine the phoneme feature of each phoneme sample by using the phoneme encoder; determine the audio feature of each audio frame sample included in the audio data sample by using the audio encoder; perform the following processing for each audio frame sample: perform forward propagation on the audio feature of the audio frame sample and the phoneme feature of at least one phoneme sample in a network composed of the attention fusion network and the phoneme classification network to obtain a first forward propagation result; perform the following processing for each audio frame sample: perform forward propagation on the audio feature of the audio frame sample and the phoneme feature of at least one phoneme sample in a network composed of the attention fusion network and the loudness classification network to obtain a second forward propagation result; determine a combined loss according to the first forward propagation result and the second forward propagation result; and update parameters of the attention fusion network, the phoneme classification network, the loudness classification network, the audio encoder, and the phoneme encoder according to the combined loss.

In some embodiments, the audio feature of the audio frame sample and the phoneme feature of at least one phoneme sample are fused. The training module 2555 is further configured to: perform attention mechanism-based fusion on the audio feature of the audio frame sample and the phoneme feature of at least one phoneme sample by using the attention fusion network to obtain the fused feature corresponding to each audio frame sample; and perform second full connection on the fused feature of each audio frame sample by using the loudness classification network to obtain a second probability that each audio frame sample belongs to each loudness category, and organize the second probability that each audio frame sample belongs to each loudness category into the second forward propagation result.

In some embodiments, the training module 2555 is further configured to: perform the following processing for each phoneme sample by using the attention layer of the attention fusion network: perform the following processing for each phoneme sample by using the attention layer of the attention fusion network: determine the weight of the corresponding phoneme sample based on the audio feature of the audio frame sample and the phoneme feature of the phoneme sample; perform value vector transformation on the phoneme feature of the phoneme sample, and multiply the weight of the corresponding phoneme sample with the value vector transformation result to obtain the attention result of the corresponding phoneme sample; fuse the attention result corresponding to each phoneme sample and the audio feature of the audio frame sample by the fusion layer of the attention fusion network to obtain the fused feature corresponding to the audio frame sample; perform first full connection on the fused feature of the audio frame sample by using the phoneme classification network to obtain a third probability that the audio frame sample belongs to each candidate phoneme; and organize the third probability and the weight into the first forward propagation result.

In some embodiments, the training module 2555 is further configured to: determine a first phoneme category loss based on the third probability that each audio frame corresponds to a plurality of candidate phonemes, and a pre-marked candidate phoneme of each audio frame sample; determine a second loudness category loss based on the second probability that each audio frame sample corresponds to a plurality of loudness categories, and the pre-marked loudness category of each audio frame sample; determine a third alignment loss based on the weight of each phoneme sample corresponding to each audio frame sample, and a pre-marked alignment identifier of each phoneme sample corresponding to each audio frame sample; and fuse the first phoneme category loss, the second loudness category loss and the third alignment loss to obtain the combined loss.

An embodiment of this application further provides a computer program product or a computer program, the computer program product or the computer program including a computer instruction, the computer instruction being stored in a computer-readable storage medium. A processor of a computer device reads the computer instruction from the computer-readable storage medium, and the processor executes the computer instruction to make the computer device perform the above method according to the embodiments of this application An embodiment of this application provides a computer-readable storage medium storing an executable instruction, the executable instruction, when executed by a processor, may cause the processor to perform the audio processing method based on artificial intelligence provided by the embodiments of this application, such as the audio processing method based on artificial intelligence shown in FIG. 3A to FIG. 3C.

In some embodiments, the computer-readable storage medium may be a memory such as an FRAM, a ROM, a PROM, an EPROM, an EEPROM, a flash memory, a magnetic memory, a compact disc, a CD-ROM, and the like; or the computer-readable storage medium may be various devices including one of or any combination of the foregoing memories.

In some embodiments, the executable instruction may be in a form of programs, software, software modules, scripts or codes, may be written in any programming language (including compiled or interpreted languages, or declarative or procedural languages), and may be deployed in any form, including being deployed as independent programs or being deployed as modules, components, subroutines or other units suitable for use in a computing environment.

As an example, the executable instruction may, but not necessarily correspond to a file in a file system, may be stored in a part of the file for saving other programs or data, for example, stored in one or more scripts in a hypertext markup language (HTML) document, stored in a single file specifically used for the program of interest, or stored in a plurality of collaborative files (such as files storing one or more modules, a submodule, or a code part).

As an example, the executable instruction may be deployed for execution on a computer device, or on a plurality of computer devices located in a same place, or on a plurality of computer devices distributed in a plurality of places and interconnected through a communication network.

In conclusion, according to the embodiments of this application, attention mechanism calculation is performed on the audio feature and the text sequence to obtain the fused feature, so that the fused feature can effectively represent the relationship between the audio frame and the phoneme. Then the phoneme classification is performed on each audio frame in the audio based on the fused feature, which can effectively improve the classification accuracy, thereby improving the alignment accuracy of the phoneme.

The foregoing descriptions are merely embodiments of this application, and are not intended to limit the protection scope of this application. Any modification, equivalent replacement, or improvement made without departing from the spirit and scope of this application shall fall within the protection scope of this application.

What is claimed is:

1. An audio processing method performed by an electronic device, the method comprising:
    determining a phoneme feature of at least one phoneme of a given text;
    determining an audio feature of an audio frame in audio data corresponding to the given text;
    for the audio frame:
        obtaining a weight of the phoneme feature of the at least one phoneme based on a mapping relationship between the phoneme feature of the at least one phoneme and the audio feature of the audio frame;
        fusing the audio feature of the audio frame and the phoneme feature of the at least one phoneme based on the weight of the phoneme feature of the at least one phoneme to obtain a fused feature of the audio frame; and
    determining a start time and a stop time of a phoneme in the audio data based on the fused feature of the audio frame.

2. The method according to claim 1, wherein a phoneme corresponding to an audio frame in the audio data is determined based on the fused feature of the audio frame.

3. The method according to claim 1, wherein the determining a phoneme feature of at least one phoneme of a given text comprises:
    for each phoneme:
    determining a characteristic representation feature of the phoneme;
    determining a location representation feature of the phoneme representing a location of the phoneme in a corresponding text unit; and
    adding the location representation feature and the characteristic representation feature to obtain the phoneme feature of the phoneme.

4. The method according to claim 1, wherein the fusing the audio feature of the audio frame and the phoneme feature of the at least one phoneme based on the weight of the phoneme feature of the at least one phoneme to obtain a fused feature of the audio frame comprises:
    performing value vector transformation on the phoneme feature of the at least one phoneme to obtain a value vector;
    multiplying the weight of the phoneme feature of the at least one phoneme with the value vector to obtain an attention result corresponding to the at least one phoneme; and
    fusing the attention result corresponding to the at least one phoneme and the audio feature of the audio frame to obtain the fused feature corresponding to the audio frame.

5. The method according to claim 1, wherein the determining a start time and a stop time of a phoneme in the audio data based on the fused feature of the audio frame comprises:
    determining at least one audio frame corresponding to the phoneme;
    determining a start time and a stop time of consecutive audio frames corresponding to the phoneme as the start time and stop time of the phoneme when the phoneme corresponds to a plurality of consecutive audio frames; and
    determining a start time and a stop time of the audio frame corresponding to the phoneme as the start time and stop time of the phoneme in the audio data when the phoneme corresponds to one audio frame.

6. The method according to claim 1, wherein the fusing the audio feature of the audio frame and the phoneme feature of the at least one phoneme based on the weight of the phoneme feature of the at least one phoneme to obtain a fused feature of the audio frame is implemented by invoking an attention fusion network, the determination of a phoneme corresponding to each audio frame is implemented by invoking a phoneme classification network.

7. An electronic device, comprising:
a memory, configured to store a computer-executable instruction; and
a processor, configured to implement a audio processing method by executing the computer-executable instruction stored in the memory, the method including:
determining a phoneme feature of at least one phoneme of a given text;
determining an audio feature of an audio frame in audio data corresponding to the given text;
for the audio frame:
obtaining a weight of the phoneme feature of the at least one phoneme based on a mapping relationship between the phoneme feature of the at least one phoneme and the audio feature of the audio frame;
fusing the audio feature of the audio frame and the phoneme feature of the at least one phoneme based on the weight of the phoneme feature of the at least one phoneme to obtain a fused feature of the audio frame; and
determining a start time and a stop time of a phoneme in the audio data based on the fused feature of the audio frame.

8. The electronic device according to claim 7, wherein a phoneme corresponding to an audio frame in the audio data is determined based on the fused feature of the audio frame.

9. The electronic device according to claim 7, wherein the determining a phoneme feature of at least one phoneme of a given text comprises:
for each phoneme:
determining a characteristic representation feature of the phoneme;
determining a location representation feature of the phoneme representing a location of the phoneme in a corresponding text unit; and
adding the location representation feature and the characteristic representation feature to obtain the phoneme feature of the phoneme.

10. The electronic device according to claim 7, wherein the fusing the audio feature of the audio frame and the phoneme feature of the at least one phoneme based on weight of the phoneme feature of the at least one phoneme to obtain a fused feature of the audio frame comprises:
performing value vector transformation on the phoneme feature of the at least one phoneme to obtain a value vector;
multiplying the weight of the phoneme feature of the at least one phoneme with the value vector to obtain an attention result corresponding to the at least one phoneme; and
fusing the attention result corresponding to the at least one phoneme and the audio feature of the audio frame to obtain the fused feature corresponding to the audio frame.

11. The electronic device according to claim 7, wherein the determining a start time and a stop time of each phoneme in the audio data based on the fused feature of the audio frame comprises:
determining at least one audio frame corresponding to the phoneme;
determining a start time and a stop time of consecutive audio frames corresponding to the phoneme as the start time and stop time of the phoneme when the phoneme corresponds to a plurality of consecutive audio frames; and
determining a start time and a stop time of the audio frame corresponding to the phoneme as the start time and stop time of the phoneme in the audio data when the phoneme corresponds to one audio frame.

12. The electronic device according to claim 7, wherein the fusing the audio feature of the audio frame and the phoneme feature of the at least one phoneme based on the weight of the phoneme feature of the at least one phoneme to obtain a fused feature of the audio frame is implemented by invoking an attention fusion network, the determination of a phoneme corresponding to each audio frame is implemented by invoking a phoneme classification network.

13. A non-transitory computer-readable storage medium, storing a computer-executable instruction that, when executed by a processor of an electronic device, causing the electronic device to implement an audio processing method including:
determining a phoneme feature of at least one phoneme of a given text;
determining an audio feature of an audio frame in audio data corresponding to the given text;
for the audio frame:
obtaining a weight of the phoneme feature of the at least one phoneme based on a mapping relationship between the phoneme feature of the at least one phoneme and the audio feature of the audio frame;
fusing the audio feature of the audio frame and the phoneme feature of the at least one phoneme based on the weight of the phoneme feature of the at least one phoneme to obtain a fused feature of the audio frame; and
determining a start time and a stop time of a phoneme in the audio data based on the fused feature of the audio frame.

14. The non-transitory computer-readable storage medium according to claim 13, wherein a phoneme corresponding to an audio frame in the audio data is determined based on the fused feature of the audio frame.

15. The non-transitory computer-readable storage medium according to claim 13, wherein the determining a phoneme feature of at least one phoneme of a given text comprises:
for each phoneme:
determining a characteristic representation feature of the phoneme;
determining a location representation feature of the phoneme representing a location of the phoneme in a corresponding text unit; and
adding the location representation feature and the characteristic representation feature to obtain the phoneme feature of the phoneme.

16. The non-transitory computer-readable storage medium according to claim 13, wherein the fusing the audio feature of the audio frame and the phoneme feature of the at least one phoneme based on the weight of the phoneme feature of the at least one phoneme to obtain a fused feature of the audio frame comprises:

performing value vector transformation on the phoneme feature of the at least one phoneme to obtain a value vector;

multiplying the weight of the phoneme feature of the at least one phoneme with the value vector to obtain an attention result corresponding to the at least one phoneme; and fusing the attention result corresponding to the at least one phoneme and the audio feature of the audio frame to obtain the fused feature corresponding to the audio frame.

17. The non-transitory computer-readable storage medium according to claim 13, wherein the determining a start time and a stop time of each phoneme in the audio data based on the fused feature of the audio frame comprises:

determining at least one audio frame corresponding to the phoneme;

determining a start time and a stop time of consecutive audio frames corresponding to the phoneme as the start time and stop time of the phoneme when the phoneme corresponds to a plurality of consecutive audio frames; and determining a start time and a stop time of the audio frame corresponding to the phoneme as the start time and stop time of the phoneme in the audio data when the phoneme corresponds to one audio frame.

18. The non-transitory computer-readable storage medium according to claim 13, wherein the fusing the audio feature of the audio frame and the phoneme feature of the at least one phoneme based on the weight of the phoneme feature of the at least one phoneme to obtain a fused feature of the audio frame is implemented by invoking an attention fusion network, the determination of a phoneme corresponding to each audio frame is implemented by invoking a phoneme classification network.

* * * * *